Sept. 4, 1962 E. P. WIGNER ETAL 3,052,613
METHOD AND APPARATUS FOR CONDUCTING A NUCLEAR CHAIN REACTION
Filed Aug. 29, 1945 12 Sheets-Sheet 1

Witnesses:
Hubert E. Metcalf
Henry H. Johnson

Inventors:
Eugene P. Wigner
Leo A. Ohlinger
Gale Young
Alvin M. Weinberg
By: Robert Lavender
Attorney.

Sept. 4, 1962    E. P. WIGNER ETAL    3,052,613
METHOD AND APPARATUS FOR CONDUCTING A NUCLEAR CHAIN REACTION
Filed Aug. 29, 1945    12 Sheets-Sheet 2

Witnesses:
Herbert E. Metcalf
Henry H. Johnson

Inventors:
Eugene P. Wigner
Leo A. Ohlinger
Gale Young
Alvin M. Weinberg
By: Robert A. Laurie
    Attorney Sept. 4, 1962   E. P. WIGNER ETAL   3,052,613
METHOD AND APPARATUS FOR CONDUCTING A NUCLEAR CHAIN REACTION
Filed Aug. 29, 1945                    12 Sheets-Sheet 6

Witnesses:
Herbert E. Metcalf
Henry N. Johnson

Inventors:
Eugene P. Wigner
Leo A. Ohlinger
Gale Young
Alvin M. Weinberg
By Robert A. Lavender
   Attorney

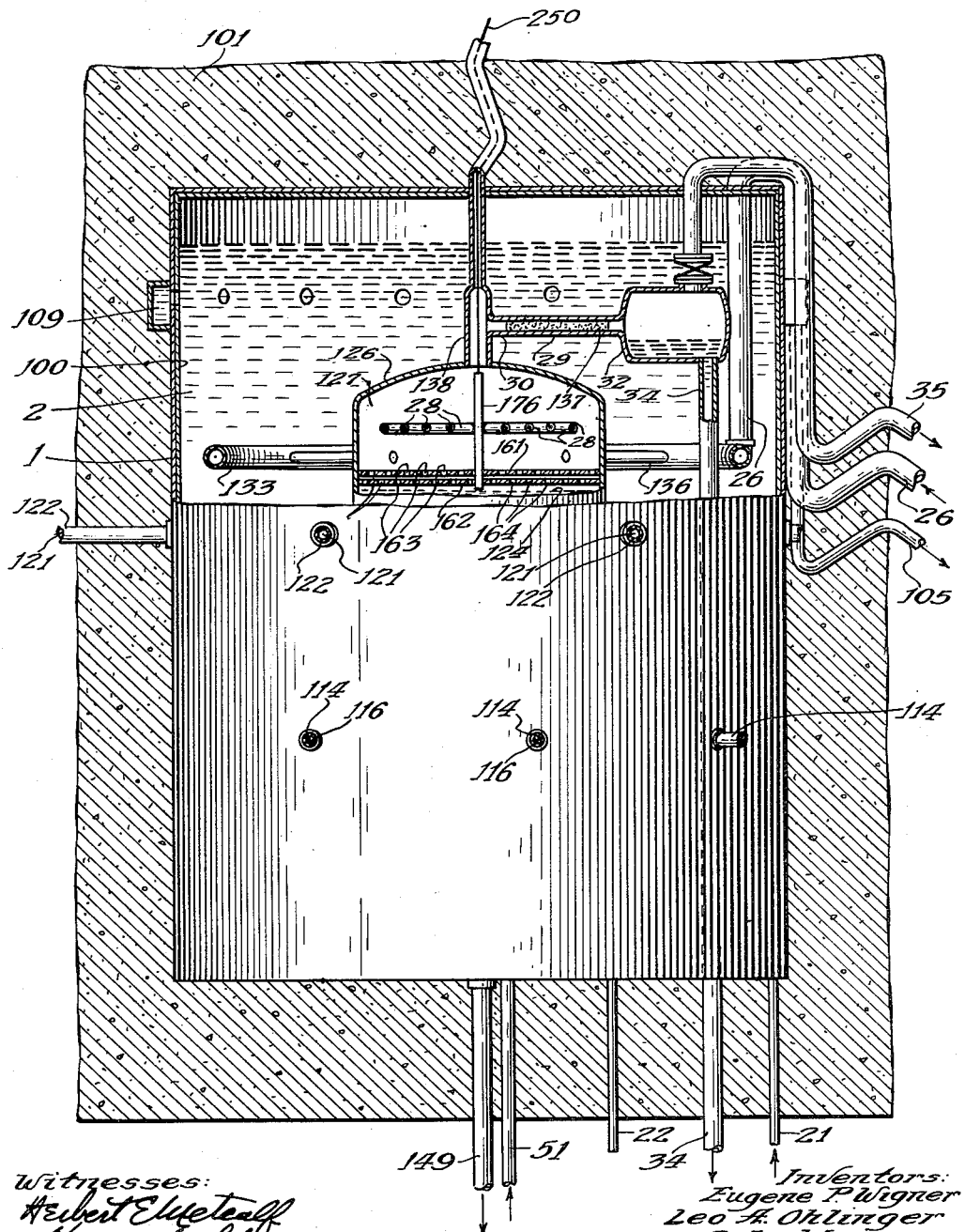

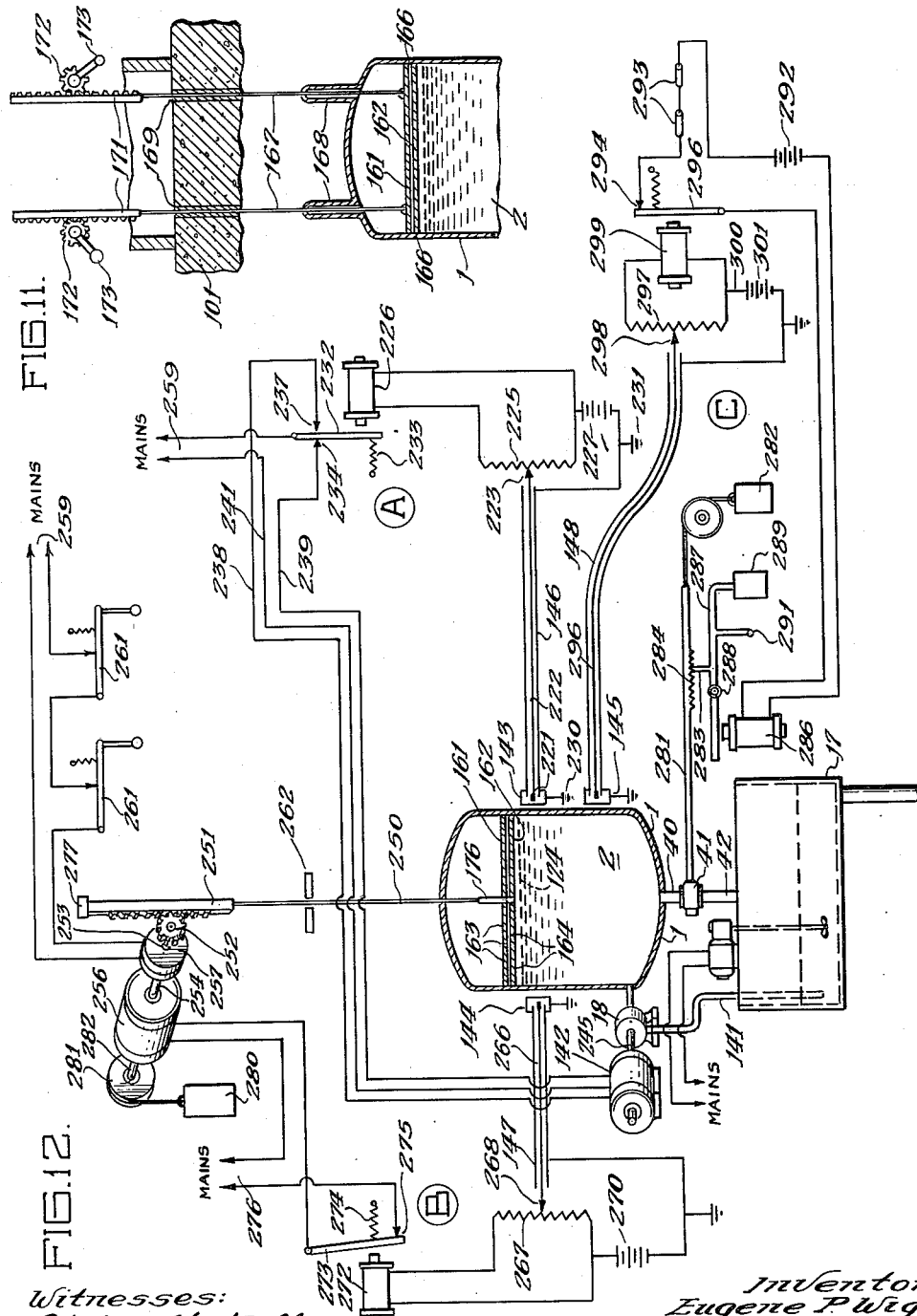

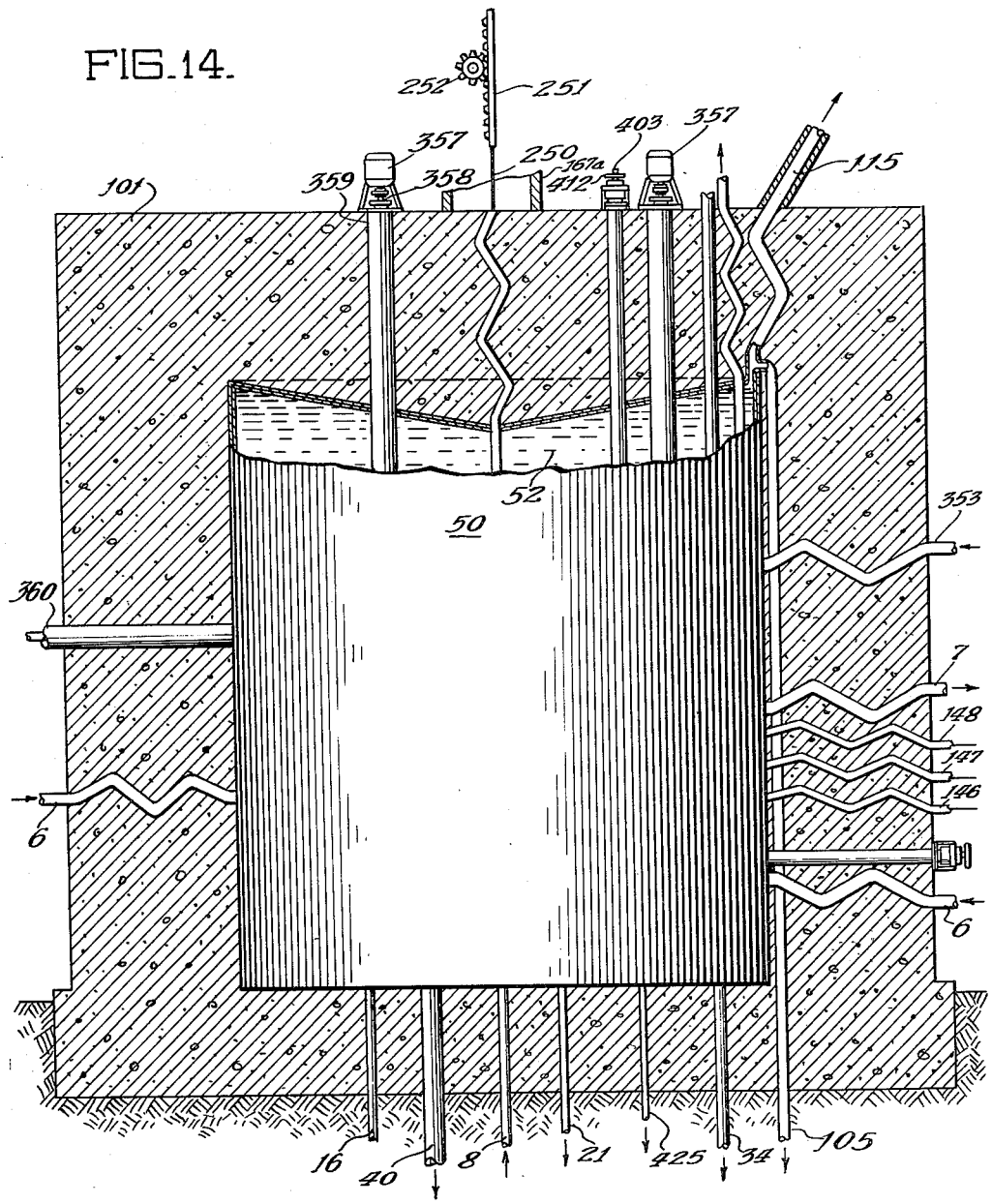

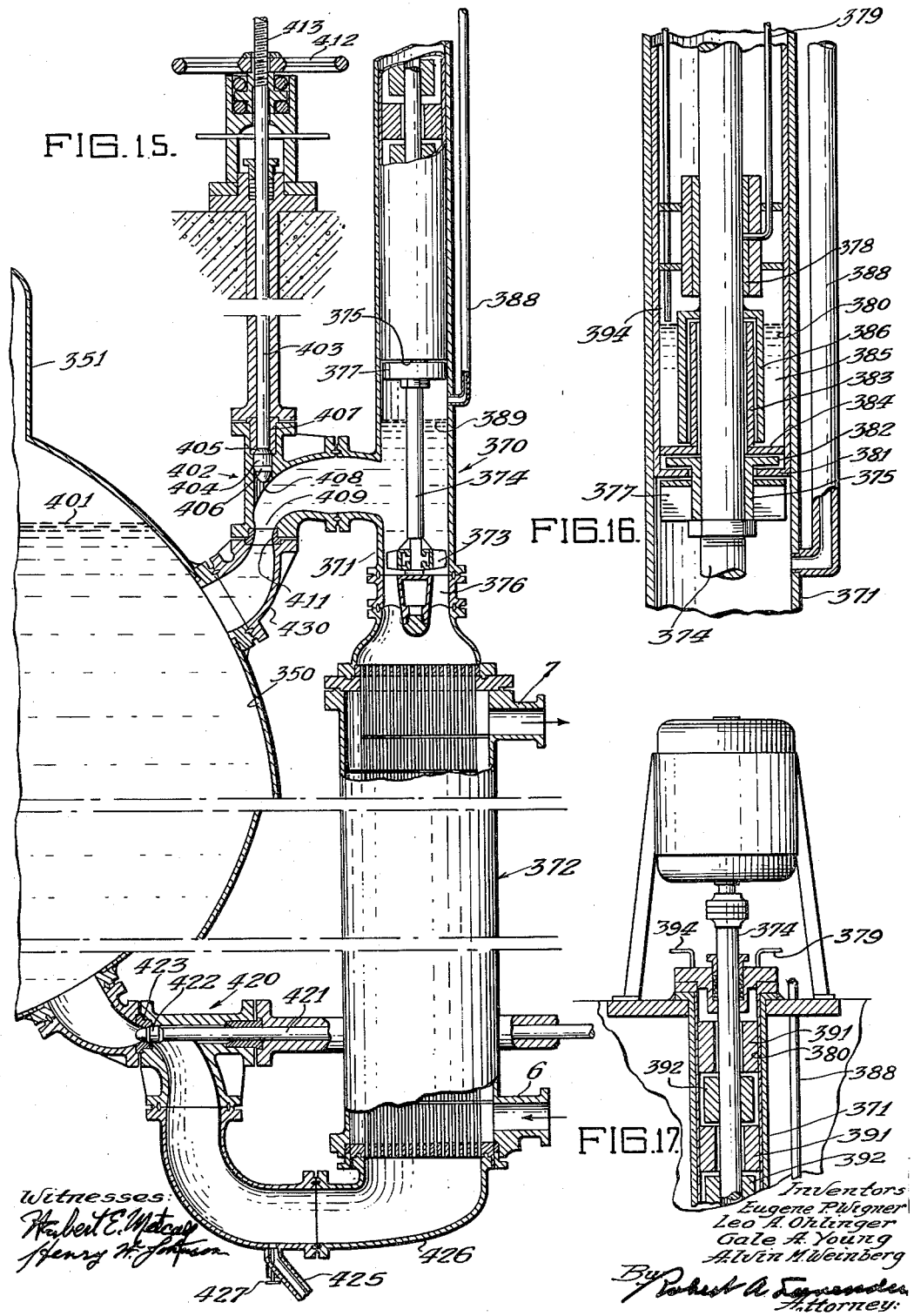

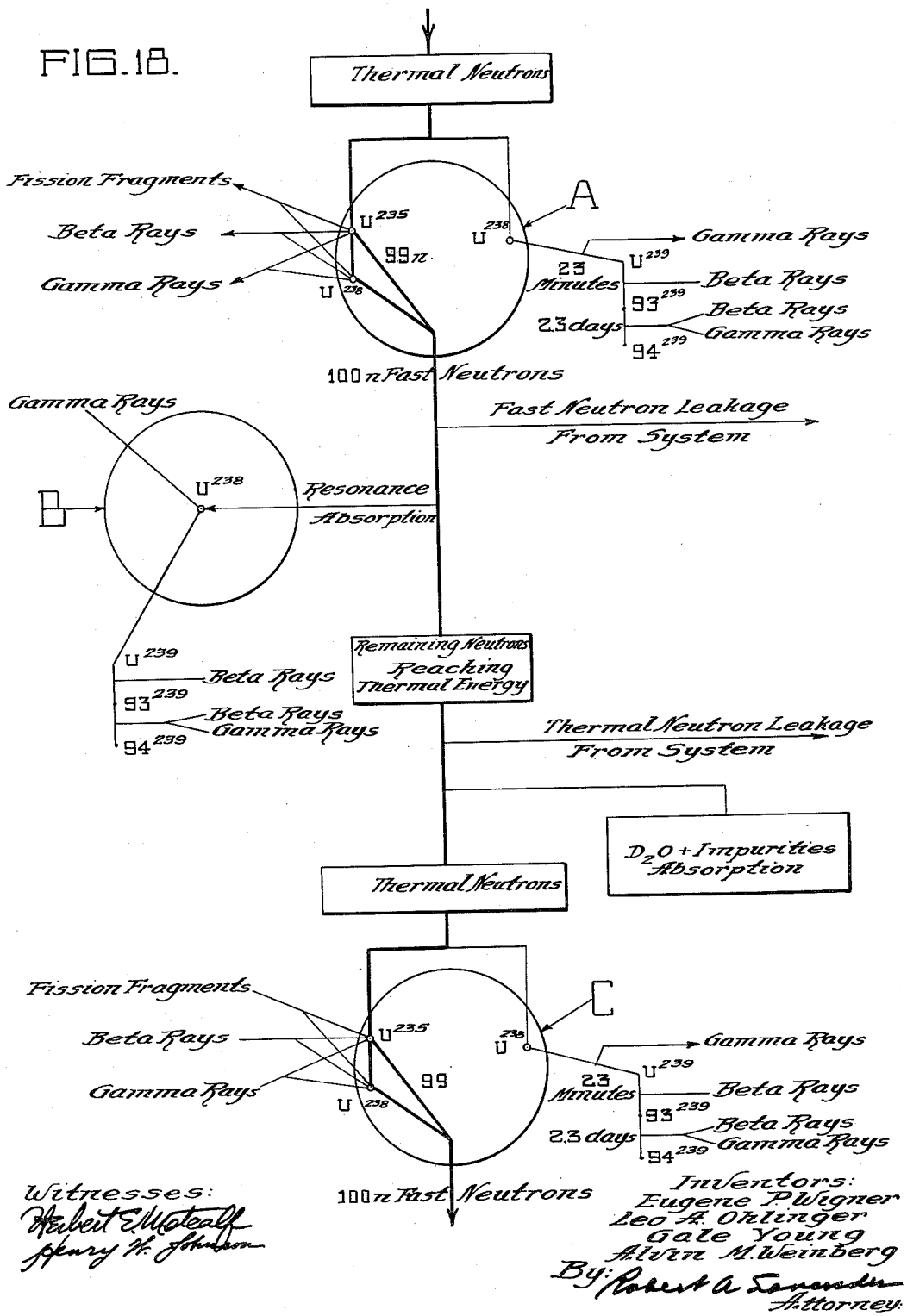

United States Patent Office 3,052,613
Patented Sept. 4, 1962

3,052,613
METHOD AND APPARATUS FOR CONDUCTING A NUCLEAR CHAIN REACTION
Eugene P. Wigner, Leo A. Ohlinger, Gale J. Young, and Alvin M. Weinberg, Chicago, Ill., assignors to the United States of America as represented by the United States Atomic Energy Commission
Filed Aug. 29, 1945, Ser. No. 613,356
15 Claims. (Cl. 204—154.2)

This invention is concerned with the establishment of a self-sustaining neutron chain reaction in a suspension of a fissionable material in a liquid moderator and is particularly concerned with the establishment of such a reaction in a suspension wherein deuterium oxide is used as the moderator.

In accordance with the present invention, a novel process and apparatus for establishment of a self-sustaining neutron chain reaction of neutrons with a neutron fissionable isotope such as $U^{233}$, $U^{235}$ and $94^{239}$ is provided. The invention is particularly advantageous since it may be applied to establishment of such a reaction in compositions such as natural uranium where the concentration of fissionable material is low. Thus, we have found that a self-sustaining reaction may be established by use of a suspension of natural uranium in a liquid moderator containing about 0.0025 to 0.04 atom of uranium per molecule of a moderator such as deuterium oxide or about 0.0013 to 0.02 atom of uranium per atom of deuterium. Where the liquid moderator is less efficient, and absorbs more neutrons than deuterium oxide, this range of uranium concentration is somewhat narrower.

The neutron reaction results in the release of substantial energy in the form of heat and consequently, the reacting suspension must be cooled or at least heat must be extracted. This heat may be removed by one of a combination of several methods including:

(1) Removal of a portion of the suspension from the reactor and extraction of heat therefrom by suitable means such as a heat exchanger.

(2) Removal of heat by a reflux system including establishment of a chain reaction in a reactor having a substantial vapor chamber permitting vapors to rise from the suspension to enter the chamber and removing heat from the vapors by heat exchange thereby condensing the vapors and returning them to the system.

(3) Passage of a heat exchange fluid in heat exchange relationship with the neutron chain reacting suspension.

Whatever method of heat exchange is used, the reaction preferably should be conducted under conditions such that no substantial change occurs in the concentration of the suspension or the effective amount of suspension in the reaction zone while the reaction is conducted. Where such changes are desired, the reactions generally are interrupted before the change is made. This is desirable since variation in the amount of suspension effectively reacting in the reactor or in the concentration of the suspension will cause variation in the neutron reproduction ratio, and if such changes are large and take place rapidly, control of the reaction becomes difficult or even impossible.

In removing the fissioning suspension from the reaction zone for heat exchange, replacement or other purposes, it is preferred to conduct the removal so that the chain reaction is discontinued while the suspension is out of the reaction zone. In accordance with this invention, this may be done by changing the shape of the liquid suspension so that the external surface per unit volume thereof is increased when the liquid is removed whereby neutron leakage from the exterior thereof is increased. Alternatively, the liquid suspension may be withdrawn from a reactor provided with a neutron reflector into a container which has no reflector or which is capable of losing a greater percentage of neutrons. Moreover, the suspension may be prevented from attaining critical size by withdrawal of but a portion of the suspension from the reactor and/or collecting the suspension in a plurality of portions smaller than critical size.

In order to prevent excessive holdup of suspension out of the reaction zone, and also to minimize loss of neutrons, it is found advantageous to utilize heat exchangers which are close to the reactor itself. Thus, the usual neutronic reactor comprises a reactive section comprising a fissionable isotope disposed in a moderator surrounded by a reflector and a shield capable of reflecting escaping neutrons back into the reactor and preventing escape of radiation from the reaction zone, respectively. In accordance with this invention, improved results may be secured by removing a portion of the suspension from the reactor, extracting heat from the suspension and returning the suspension to the reaction zone. This minimizes holdup and in addition permits a saving in neutrons. Thus, circulation of coolant through the reaction zone usually results in absorption of neutrons by the coolant and the cooling tubes. Moreover, in fission reactions some quantity of neutrons are evolved almost instantaneously while a portion, usually about one percent, are evolved much later, some being evolved one or several seconds, and others several minutes after fission. The present process may be conducted so as to cool the removed suspension and return it to the reactor before all of the delayed neutrons are evolved, thereby effecting a neutron saving. The amount of neutrons so saved depends upon the speed of return and the volume of suspension outside the reactor.

Provision of some or all of the methods and apparatus discussed above constitutes some of the principal objects of the invention, others of which will become apparent in view of the ensuing disclosure and accompanying drawings wherein;

FIG. 1 is a flow diagram showing the principal features of our invention;

FIGS. 2 to 5, inclusive, are diagrams representing four methods of cooling a nuclear fission chain reacting system in accordance with our invention;

FIG. 10 is a view similar to FIG. 7 partially in section along the line 10—10 of FIG. 9;

FIG. 11 is a fragmentary view of a portion of our apparatus used to limit the nuclear chain reaction therein;

FIG. 12 is a schematic diagram representing three methods for controlling a nuclear chain reaction in accordance with our invention;

FIG. 14 is a partially sectionalized view of the embodiment shown in FIG. 13 (somewhat reduced in size) enclosed in a concrete shield;

FIG. 15 is an enlarged vertical sectional view of a portion of the apparatus shown in FIG. 13 showing one type of circulating, pumping and valving system particularly adapted for use with our chain reacting system;

FIG. 16 is a further enlarged sectional view of a circulating pump casing used in combination with the pump shown in FIG. 15;

FIG. 17 is a partially sectionalized view of the motor drive used in combination with the pump of FIG. 15; and FIG. 18 is a diagram representing distribution of neutron losses in our self-sustaining chain reacting system.

Figure 1:
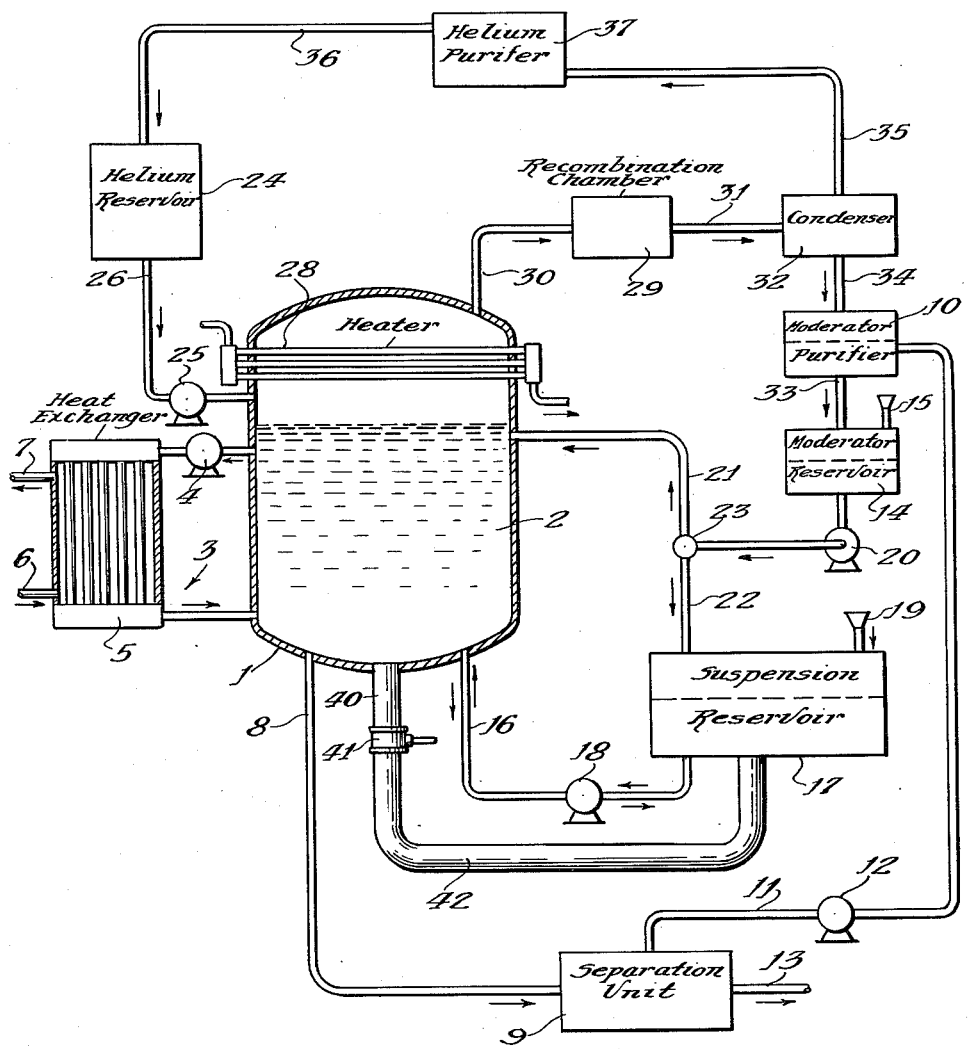

The invention as described is particularly applicable to solid suspensions of the slurry type in which a solid, fissionable component is suspended in amount substantially in excess of its solubility in the moderator. Various fissionable solids may be used. However, the oxides, for example $UO_2$, $U_3O_8$ or $UO_3$, are particularly suitable where an aqueous suspension is used since such compounds are comparatively stable.

In order that a self-sustaining neutron chain reaction can be established and maintained, the losses of neutrons must be held to a value so low that at least one neutron is available for fission after all losses have been deducted, per neutron consumed in fission. For example, about 2.3 neutrons are evolved per neutron consumed in fission of $U^{235}$ and about 2.8 neutrons are evolved per neutron consumed in fission of $94^{239}$. These evolved neutrons are used up in fission of a further quantity of fissionable material or are lost. If the losses do not reduce the ratio of neutrons evolved to neutrons consumed or lost below one, the chain reaction will continue.

Losses may be external or internal. External losses take place when neutrons escape from the reaction zone of a neutronic reactor and are not returned to the reaction zone. For a reactor of infinite size, it is apparent that these exterior losses or neutron leakage would be zero. However, reactors of finite size have a finite leakage and, generally speaking, the magnitude of neutron leakage increases as the ratio of external surface area to volume of a reaction zone increases. Thus, spherical reactors which have a minimum ratio of surface to volume will have a minimum leakage, whereas a body of liquid suspension which is much greater in width and breadth than in depth will have a relatively high leakage. Similarly, even in spherical reactors, the amount of leakage increases as the size of the reactor decreases. For a system which is capable of establishing a chain reaction at infinite size, there is a finite critical size at which leakage becomes sufficiently low to permit maintenance of such a reaction once established.

In the case of a spherical structure employing uranium bodies of any shape or size imbedded in our moderator, the following formula gives approximately the critical overall radius:

Critical sphere R cm., $R = \dfrac{56.5}{\sqrt{K-1}}$ where K is the neutron reproduction factor of the system for infinite size.

For a parallelepiped structure rather than spherical, the critical size can be computed from the formula $$K - 1 = 323\pi^2 \left( \dfrac{1}{a^2} + \dfrac{1}{b^2} + \dfrac{1}{c^2} \right)$$

where $a$, $b$, and $c$ are the lengths of the sides in centimeters. The critical size for a cylindrical structure is given, irrespective of the shape of the uranium bodies, by the formula, Cylinder $h$ cm.  
Radius R cm.   $K - 1 = \dfrac{323\pi^2}{h^2} + \dfrac{777}{R^2}$ Interior losses occur by absorption of neutrons by atoms which do not fission when the neutron has been absorbed. For example, $U^{238}$ which is present in natural uranium absorbs substantial quantities of neutrons to produce $94^{239}$. Within reason this absorption offers certain advantages since the $94^{239}$ formed tends to replace the $U^{235}$ consumed and thus to increase the life of the reaction. At the same time, however, this absorption may in some cases become so great as to prevent establishment of a chain reaction.

Neutron moderators also absorb neutrons. Generally speaking, the moderator used in accordance with this invention should be a fluid of low atomic weight and low neutron capture cross-section. Bismuth, deuterium and helium are good moderating elements. The ability to slow down neutrons may be expressed by what is known as the scatter cross-section, whereas the ability to absorb or capture neutrons may be expressed as the capture cross-section. The ratios of absorption cross-section to scattering cross-section of various materials are approximately as follows:

| | |
|---|---|
| Light water ($H_2O$) | 0.00478 |
| Diphenyl | 0.00453 |
| Heavy water ($D_2O$) | 0.00017 |

For natural uranium it is preferred to use materials wherein the above ratio is below about 0.004. However, with enriched uranium compositions containing more than natural amounts of $U^{235}$, a greater latitude is permissible. Using carbon or deuterium oxide as moderators and natural uranium as the fissionable composition, only about 1.1 or 1.3 neutrons, repectively, are obtained per neutron consumed due to neutron losses in the $U^{238}$ and the moderator. Since the external neutron losses may be substantial, internal neutron losses should be held sufficiently low to prevent these losses from rising so high as to prevent the reaction.

Other components of the reactor including the coolant, impurities in the uranium or moderator, control or limiting rods, fission fragments, etc. absorb neutrons in varying amounts depending upon their neutron capture cross-section. The effect of these impurities or absorbers in a reactor containing natural uranium as the fissionable component has been approximately evaluated for various elements as a danger coefficient. This coefficient is computed according to the formula, $$\dfrac{T_i A_i}{T_u A_u}$$

where $T_i$ represents the cross-section for absorption of thermal neutrons of the impurity;

$T_u$ represents the cross-section for absorption of thermal neutrons of the uranium;

$A_i$ represents the atomic weight of the impurity or neutron absorber; and $A_u$ represents the atomic weight of uranium.

The following table gives presently known values for various elements having their natural isotopic content.

| Element: | Danger coefficient |
|---|---|
| He | 0 |
| Li | 310 |
| B | 2150 |
| N | 4.0 |
| F | 0.02 |
| Na | 0.65 |
| Mg | 0.48 |
| Al | 0.30 |
| Si | 0.26 |
| P | 0.3 |
| S | 0.46 |
| Cl | 31 |
| K | 2.1 |
| Ca | 0.37 |
| Ti | 3.8 |
| V | 4 |
| Cr | 2 |
| Mn | 7.5 |
| Fe | 1.5 |
| Co | 17 |
| Ni | 3 |
| Cu | 1.8 |
| Zn | 0.61 |
| Ga | ~1 |
| As | 2 |
| Se | 6.3 |

| Element: | Danger coefficient |
|---|---|
| Br | 2.5 |
| Kr | <6 |
| Rh | 50 |
| Ag | 18 |
| Cd | 870 |
| In | 54.2 |
| Sn | 0.18 |
| Sb | 1.6 |
| I | 1.6 |
| Ba | 0.30 |
| Sm | ~1430 |
| Eu | 435 |
| Gd | ~6320 |
| Pb | 0.03 |
| Bi | 0.0025 |
| Th | 1.1 |

From the above it will be apparent that certain elements are objectionable if present in substantial amounts in neutronic reactors. For example, cadmium, boron and gadolinium absorb neutrons to a high degree, and may be used effectively to control the reaction by variation of the amount present in the system. On the other hand, aluminum and beryllium are typical of the elements which can be used in the reactor for cooling pipes or other structure, or may be present as an impurity although the amount thereof must be limited. For example, if a neutronic reactor is capable of supplying 1.06 neutrons per neutron consumed in fission when all losses exclusive of that caused by aluminum have been taken into account, then the loss due to the presence of aluminum can not exceed $$\frac{0.06}{0.30}$$

part by weight per part of uranium or 20 percent of the weight of the uranium. These principles generally apply to other metals or materials.

From the above it will be apparent that for a neutron chain reaction to remain self-sustaining the equation $$n-x-y-z-L \geqq 1$$

where $n$=number of neutrons evolved by a fission of a fissionable isotope per neutron consumed in fission of such isotope.

$x$=number of neutrons absorbed by a nonfissioning isotope such as $U^{238}$ in formation of a fissionable isotope per neutron consumed in fission.

$y$=number of neutrons absorbed by the moderator per neutron consumed in fission.

$z$=number of neutrons absorbed by other neutron absorbers per neutron consumed in fission, and $L$=the number of neutrons lost from the system by leakage per neutron consumed in fission.

Thus, with $U^{235}$ the sum of $x+y+z+L$ cannot exceed about 1.3 and with $94^{239}$ cannot exceed about 1.8.

The ratio of the fast neutrons produced in one generation by the fissions to the original number of neutrons producing the fission in a system of infinite size from which there can be no loss is called the reproduction factor and is denoted by the symbol K. The K constant of a system of finite size is the reproduction factor which the system would have if expanded to infinite size. Usually this constant is expressed without regard to localized neutron absorbers such as control or limiting rods, which are not uniformly dispersed throughout the entire system. The neutron reproduction ratio (r) is an actual value for a finite system, and differs from K by a factor due to loss of neutrons through leakage and through absorption by localized neutron absorbers. To maintain a chain reaction, $r$ must be at least equal to one but it is preferably maintained below about 1.01 during operation of the reactor.

Computation of K for any system may be determined experimentally in accordance with methods described in copending application of E. Fermi, Serial No. 534,129, filed May 4, 1944, entitled "Nuclear Chain Reacting System," now Patent No. 2,780,595, dated February 8, 1957

The reproduction ratio (r) may be ascertained by observation of the rate of increase of neutron density. It may also be predicted by computation of losses due to local absorbers or leakage which may be deducted from K to secure this value. In such a case allowance for leakage is made depending upon the size of the reactors. For reactors of practical size, leakage ratio usually amounts to about 0.01 to 0.3 neutron per neutron consumed in fission depending upon the amount by which the K of the system exceeds one. Loss due to other absorbers may be computed by computation of the danger sum as heretofore described.

While we will refer to natural uranium or uranium alone as the active material of the suspension, it will be appreciated that any fissionable material such as $U^{233}$, $U^{235}$, or $94^{239}$, or natural uranium or thorium which is enriched with any of such isotopes, and various compounds thereof that are compatible with the heavy water may be used in following the teachings of our invention.

Referring first to FIG. 1 which shows a flow diagram of a self-sustaining nuclear fission chain reacting system, the chain reaction is caused to occur in a container or reaction tank 1 partially filled with the solid suspension which may be a slurry 2 which is pumped through a circulating system generally designated 3 by a pump or other circulating means 4 for the purpose of cooling the slurry. The circulating system 3 is provided with a heat exchanger 5 through which cooling water may be made to flow as shown by the inlet 6 and outlet 7. Inasmuch as it is an object of our invention to provide means to continuously remove portions of the suspended uranium for recovery of the reaction products, we prefer to provide at the base of the reaction tank 1 an outlet 8 through which the slurry may be withdrawn into a uranium-liquid moderator separating chamber 9. As appears hereinafter, the slurry is withdrawn through the outlet 8 continuously but the quantity thereof is relatively small, being for the purpose of withdrawing a portion of the uranium for removal of elements 93 and 94 as well as fission elements and products produced by the chain reaction. Chamber 9 is provided with separating means for separating the solid matter from the slurry such as by evaporation of the heavy water which is delivered to a purifying tank 10 through the line 11 and pump 12 where the water may be purified by distillation or other methods. The uranium bearing material separated from the slurry is withdrawn from the chamber 9 in any desired manner, as through the piping 13, whereupon the elements 93, 94 and fission products may be separated from one another. Inasmuch as the separation of these products from the uranium of the slurry forms no specific part of our invention, the process of separating these products is not discussed in detail herein.

The purified heavy water is stored in a tank 14, the supply therein being maintained from an outside source such as through the pipe line 15. In addition to the outlet 8, through which a portion of the slurry is removed from the system, we have shown another pipe line 16 for passing the slurry in the tank 1 to and from a slurry reservoir 17 by a reversible pump 18 in the line 16. As appears hereinafter in further detail, the reversible pump 18 is used to control the slurry volume in the reaction tank in accordance with one teaching of our invention. The desired concentration of uranium material may be maintained in the slurry by introducing additional material into the slurry reservoir 17 through the line 19 while additional heavy water may be delivered by pump 20 from the heavy water reservoir 14, either to the reaction tank 1 through the line 21 or to the slurry reservoir 17 through the line 22 controlled by a three-way valve 23. In this manner, the concentration of the uranium may be maintained at any desired value both in the reaction tank and in the slurry reservoir.

As indicated above, the chain reaction is initiated by nuclear fissions produced by neutrons slowed to thermal energy by collision of faster neutrons with the heavy water. Some of these neutrons are effective in decomposing a portion of the heavy water into deuterium and oxygen, and consequently, in accordance with a further teaching of our invention, we provide means causing recombination of the products of decomposition thereby conserving the heavy water for reuse in the system. Referring again to FIG. 1, we provide an atmosphere of helium or other inert gas of low absoprtion over the slurry 2 in tank 1 to dilute the evolved gases to a degree such that formation of an explosive mixture is prevented. The helium is supplied from a reservoir 24 through a pump 25 and pipe line 26 entering the upper portion of the tank 1, thereby directing the gases over a hot grid shown diagrammatically at 28 supported in the upper portion of the tank 1 over the normal level of the slurry 2. The hot grid 28 or equivalent igniter heats the gases to their recombining temperature, but to positively assure recombination, we prefer to provide, in addition, a catalyst chamber 29 connected with the upper portion of the tank 1 by pipe line 30 through which the remaining uncombined gases are driven by the helium. In the presence of the catalyst in the chamber 29 the gases heated but not recombined by the hot grid 28, recombine to form heavy water vapor which is directed by the helium flow through pipe line 31 to a condenser 32 where the vapor is condensed and directed to the purifying tank 10 through the pipe line 34 and thence to the heavy water reservoir 14 through the line 33. The helium is returned to the reservoir 24 by pipe lines 35 and 36 following purification in helium purifier 37.

As indicated above, the nuclear chain reaction in the reaction tank is controlled by varying the level of the slurry therein to change the volume above or below that corresponding to critical size. As an emergency safety precaution we provide means to dump the slurry from the reaction tank into the slurry reservoir. We have shown a pipe line 40 leading to a safety dump valve 41 and thence through line 42 to the slurry reservoir 17. Upon opening the valve 41 such as in response to a safety control circuit described later, the slurry level in the reaction tank 1 is decreased very rapidly, thereby terminating the reaction therein in case of failure or any improper action of the system.

It will be fully appreciated that the self-sustaining chain reaction is initiated merely by exceeding the critical size of the suspension at which the reproduction ratio slightly exceeds unity. Consequently, any volume of this slurry of similar configuration to that contained in the reaction tank, will likewise support a self-sustaining nuclear chain reaction provided the neutron reflectory properties of the container are as good as those of the reacting tanks. It is, therefore, exceedingly important that the slurry reservoir should be of such configuration or construction that even with a maximum quantity of slurry therein a self-sustaining chain reaction cannot be either initiated or maintained in this reservoir. The reservoir 17 should, therefore, be made to have a large surface-to-volume ratio and/or should have less neutron reflecting properties than the reactor so that the neutron losses from the surface thereof exceed the minimum surface losses necessary to allow a self-sustaining reaction. This may be accomplished by making the slurry reserve tank of large cross-sectional area and with minimum depth, or with small cross-section and maximum depth or as a plurality of small mutually separated tanks. For example, if the slurry reservoir is of rectangular form, the maximum allowable dimensions are easily determined from the formula given above for critical size at the maximum attainable reproduction factor whereupon the tank is made somewhat smaller as a precaution against developing a chain reaction therein. In addition, the tank may be constructed of or contain cadmium plates or baffles which effectively absorb neutrons thereby eliminating all possibility of developing a self-sustaining reaction in the slurry outside of the reaction tank. Moreover, if a neutron reflector is used around the reactor, it may be omitted in the reservoir.

In addition to the cooling system shown in FIG. 1, the entire apparatus including the tank 1, heat exchanger 5, associated pump 4, slurry reservoir 17, its associated pump 18, catalyst chamber 29 and condenser 32 is immersed in water for cooling and shielding purposes within a concrete or other good neutron and gamma ray shield for protection of operating personnel. This circulation system and shield is not shown in FIG. 1 for the sake of clarity.

In the operation of the system shown and so far described in FIG. 1, the chain reaction within the reaction tank 1 develops considerable energy in the form of beta and gamma rays, as well as kinetic energy from the fission products. A great portion of this energy is released inside the system in the form of heat and is absorbed by the heavy water of the slurry and withdrawn from the system by circulating the slurry through the heat exchanger 5, the heat being transferred to the cooling water flowing between the inlet and outlet piping 6 and 7. The heat developed by the chain reaction may be removed in a number of different ways or combinations thereof.

We have shown in FIGS. 2–5 wherein corresponding structure shown in FIG. 1 is similarly referenced, various cooling means whereby this heat may be dissipated. For example, the heat may be dissipated by flowing a coolant over the external surface of the chain reaction chamber, by withdrawing a portion of the slurry from the reaction chamber, and cooling the slurry exteriorly, by circulating a coolant through conduits in the slurry chamber and above the slurry level to condense heavy water vapor in the region over the slurry, by flowing the coolant though conduits immersed in the slurry, or by any combination of these methods.

Figure 2:
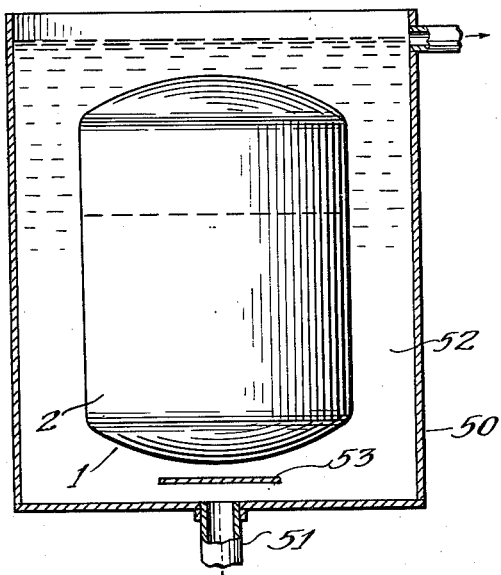
Figure 3:
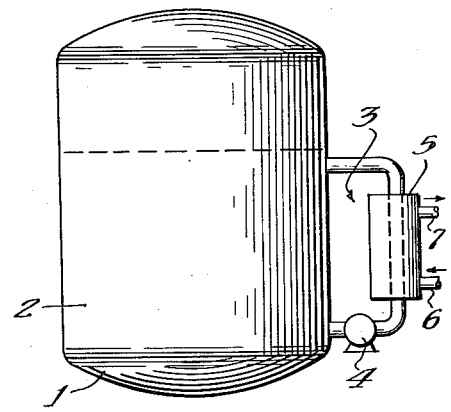
Figure 4:
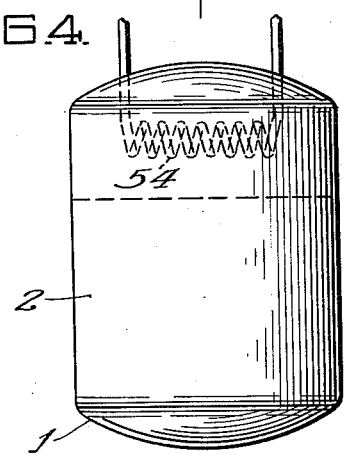
Figure 5:
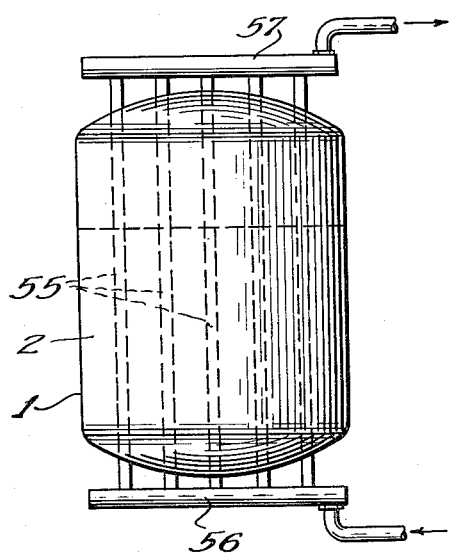

Referring to FIG. 2, we have shown very schematically a reaction tank 1, without any of the auxiliary supply piping partially filled with slurry 2 surrounded by a cooling water tank 50 and with a coolant pipe line conduit 51 entering the tank 50 immediately below the chamber carrying a coolant such as water 52 which flows around the baffle 53 and around the tank 1, absorbing heat therefrom. In this mode of cooling the tank 1 may be wholly immersed in the coolant, the flow being directed in any direction over the external surface thereof. FIG. 3 shows a method wherein the slurry 2 itself may be cooled by withdrawing a portion thereof through a circulating system designated 3 and being driven through a heat exchanger 5 by a pump 4, the heat in the slurry being withdrawn by cooling water or other medium circulated through the heat exchanger between the inlet 6 and outlet 7. The slurry may be circulated by thermo-syphon action without the use of the pump although some sacrifice in cooling capacity ensues. The heat exchanger may, however, be formed integrally with the tank 1 as shown in FIG. 4, wherein a conduit 54 is provided within the tank 1 in the upper portion thereof and supplied with a coolant such as water flowing therethrough to condense heavy water vapor developed within the slurry and collecting in the upper portion of the tank 1. Alternatively, as shown in FIG. 5, the slurry 2 may be cooled by providing a series of tubes 55 within the tank 1 extending between headers 56 and 57 through which the coolant may be made to flow.

During circulation through the heat exchanger, the neutronic reaction is discontinued. This is accomplished by proportioning the size of the reactor and heat exchanger and/or apportioning the volume of suspension in the reactor is and exchanger such that the volume of suspension in the reactor is above critical size while the volume of suspension in the heat exchanger is below critical size.

Obviously, any of the four cooling systems shown in FIGURES 2 through 5 or combinations thereof may be used for the purpose of cooling the slurry continuously with the chain reaction in progress. For example, and as it appears more fully hereinafter, the cooling systems shown in FIGS. 2 and 3 may be combined to cool the slurry not only from the outside of the reaction chamber but by withdrawing the slurry for cooling in an external heat exchanger.

The nuclear chain reaction within the reaction tank 1 is dependent upon the nuclear fission of the $U^{235}$ constituent of the uranous material of the slurry when subject to thermal neutrons, and also on fission of $94^{239}$ as $U^{235}$ is used up. During the fission process fast neutrons are emitted by the uranium and these fast neutrons are slowed to thermal energy, this being the function of the moderator. However, there must be sufficient uranium in the slurry to intercept the neutrons once they have reached thermal energy. Consequently, the ratio of uranium atoms to the atoms of the moderator producing the slowing effect must be such that the slowing is sufficient, the availability of uranium in the paths of the slow neutrons is adequate, and the neutron loss occasioned by resonance capture is insufficient to overcome the neutron gain occasioned by the fission process, so that a self-sustaining chain reaction is possible.

Figure 6:
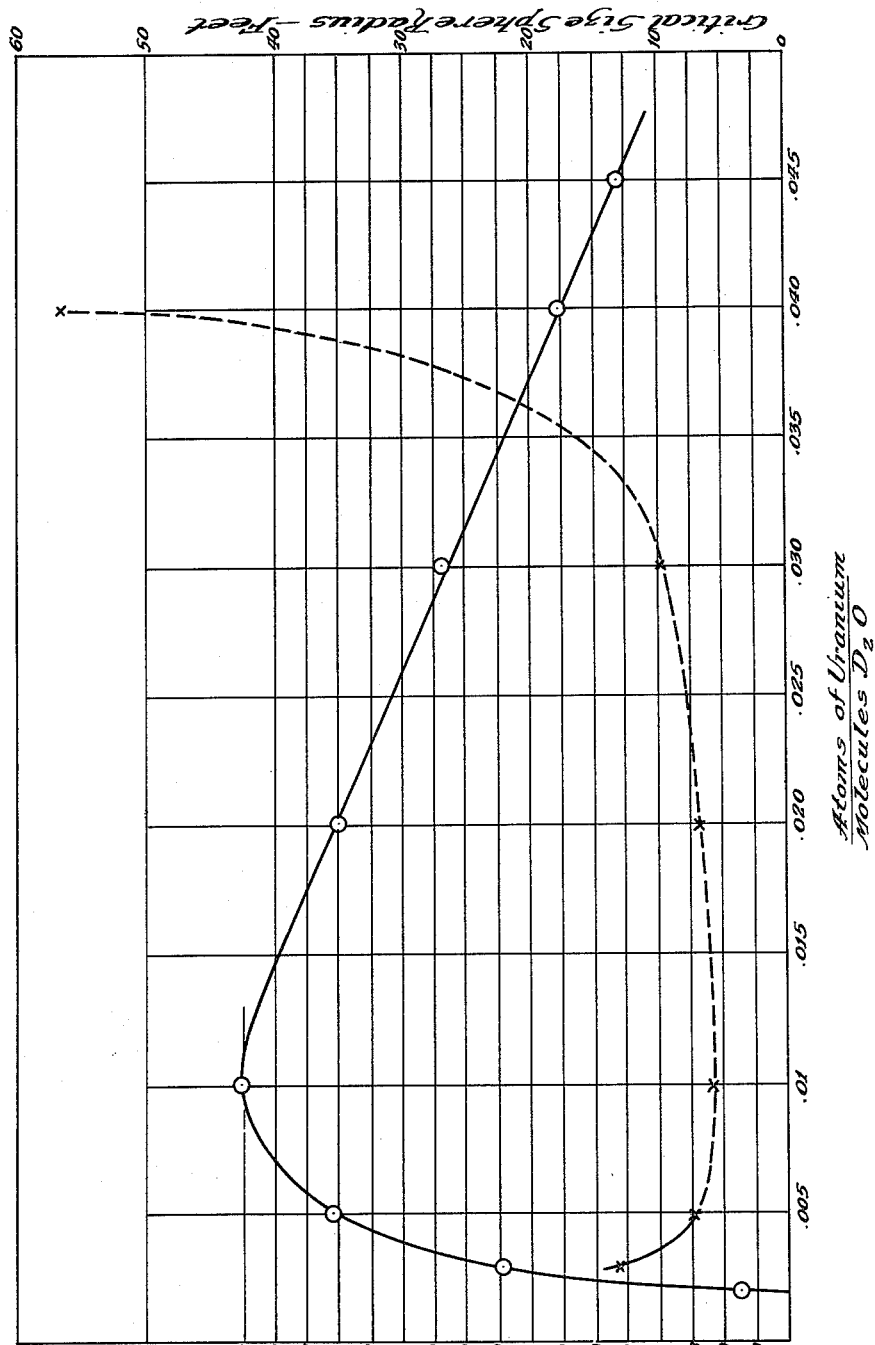
FIG. 6 is a set of curves representing reproduction factor for various natural uranium to moderator ratios.

The full line curve shown in FIG. 6 has been drawn for a moderator of heavy water of availability purity from calculations based on an absorption cross-section, per molecule of pure heavy water ($D_2O$), of $0.004 \times 10^{-24}$ cm.$^2$, the ordinates representing values of reproduction factor K, the abscissae being various ratios of uranium atoms to heavy water molecules of the slurry.

From the full line curve of FIG. 6 it will be appreciated that as the concentration of uranium in the heavy water is increased, the value of K increases from values below unity and reaches a peak of 1.10 at a concentration of about 0.01 atom of uranium per molecule of heavy water. Thus the mass of the suspension and the arrangement of the system must be such that the leakage cannot exceed 1.1–1 or 0.1 K unit, and in any event the leakage cannot be so great that 1 plus the leakage factor in terms of K exceeds the ordinates defined by the curve of FIG. 6. Since the system will operate equally as well, with respect to slurry concentration, with a reproduction factor slightly over unity for a high and low concentration of uranium, and since uranium is at present cheaper to produce than heavy water, the concentration which is used to provide the slurry is preferably in the higher range such as about 0.023 atom of uranium per molecule of heavy water which, neglecting the very low danger coefficients of oxygen content of the uranium oxide preferably used, provides a K factor of 1.060. When using $UO_2$ as the uranium source this corresponds to approximately one part oxide to four parts heavy water by weight. On a volume basis, the oxide solids represent about 4 percent of the slurry volume.

From the full line curve FIG. 6, it will be appreciated that a low ratio of uranium to moderator such as 0.0025 atom of uranium per molecule of moderator may be used. Such use would reduce erosion of the slurry circulating system and pumps, but small variations in concentration cause greater variations in the reproduction factor over this portion of the curve than to the right of the maximum K value, rendering the system more critical to control. Consequently, we prefer to utilize the higher uranium-to-moderator ratio indicated above. At all events the uranium concentration of the slurry or solution should be maintained substantially constant during the reaction since substantial changes make the reaction difficult or impossible to control.

The particle size of the uranium oxide is preferably below 2 microns ($\mu$). This size of the individual particles is dictated principally by the abrading action of the particles on the pumps, valves and heat exchanger tubes. For larger particle sizes erosion may be excessive. While erosion does not materially affect the mechanical operation of the system, it tends to poison the system by the inclusion of iron and other metals worn from the slurry circulating system. However, continued circulation of the slurry reduces the particle size by abration of the oxide particles upon each other. For example, a slurry originally of $50\mu$ to $70\mu$ size was reduced to a point where 85 percent of the material was below $2\mu$ by pumping through a circulating system for 60 hours at 20 feet per second. Consequently, in the initial stages of operation a somewhat larger slurry particle size may be tolerated although sizes below 2 microns are preferred. As operation continues, the particle size will decrease, and for particle sizes below $0.001\mu$ the erosion may be no more than that produced by a solution of the same densty: Alternatively, the slurry may be pumped through an auxiliary system prior to use in the chain reacting system to reduce the uranium oxide particle size. Such a system may be constructed of materials having very low danger coefficients so that the slurry, while contaminated to a small degree, has less neutron absorbing impurities than it would have if it had been initially run in the chain reacting system. Thus, an auxiliary system may be made of materials such as aluminum having a low danger coefficient whereas such materials used in the reaction circulating system would be subject to early wear and premature failure.

With larger bodies of uranium, the size and distribution of the uranium-bearing particles disposed in a moderator affect the value of the reproduction factor K because the resonance loss (absorption by $U^{238}$) increases with decrease in particle size. This effect has no practical importance, however, in the present system, because the size range in which this effect occurs is outside the limits imposed by circulation of the slurry. For example, to provide an optimum reproduction factor the particles would have to be one centimeter or larger in diameter. Conversely, while decrease in particle size lowers the reproduction factor somewhat, the loss in neutrons by reason of the larger surface resonance capture provides a net gain in the production of elements 93 and 94. This will be set forth more fully below with reference to a diagram showing distribution of neutron losses in our system.

The structural form of the reaction tank may be of any desired shape such as spherical, cylindrical, parallelepiped, or combination thereof, as long as the volume thereof is sufficient and is concentrated (i.e., so that the surface-to-volume ratio for the reacting material is sufficiently low) to reduce surface losses within the confines as dictated by the maximum reproduction factor. We have shown in FIG. 6 a curve in dashed line detail wherein the relation of critical size of a spherical structure of radius R to the slurry concentration is approximately given. From the value of K corresponding to any slurry concentration, the minimum radius at which the reaction becomes self-sustaining represents the critical size for that condition. A spherical type of reaction tank represents the most economical utilization of the slurry although for ease in construction and control the cylindrical form may be preferred.

Referring generally to FIGS. 7 to 10, inclusive, we have shown a system wherein the reaction tank 1 is cylindrical and adapted to contain a slurry of height approximating the diameter. For a minimum size and consequent savings in heavy water, it may be desirable to provide a slurry concentration providing the highest practical reproduction factor. Consequently, using the formula given above for a cylindrical structure, the minimum cylindrical reaction tank volume would be approximately 11 feet in height and in diameter. However, the reaction tank may be somewhat larger to allow for variations in slurry concentration, possible poisoning of the reaction by the formation of neutron absorbing fission products, reduction in the reproduction factor by impurities in the uranium oxide including material removed by erosion of the circulating system, and other variables. These variables may be allowed for by calculating the total effect of these variables on the reproduction factor and a reasonable reduction in the factor may be considered to be approximately 4 percent.

Using the 4 percent design safety factor to insure a reaction notwithstanding this reduction in K, the reaction tank would be made approximately 14 feet in diameter, the depth of the slurry in the tank being somewhat less than 14 feet depending on the actual neutron absorbing impurities in the slurry. For absolutely pure materials and for a slurry concentration of about .01 uranium atom per molecule of heavy water, the depth to obtain a self-sustaining neutron reaction in a 14 ft. tank is approximately 6 feet. Consequently, to initiate the reaction in the tank, the level is increased until the critical size, for the particular concentration of slurry and impurity content, is exceeded slightly, whereupon the reaction becomes self-sustaining and may be stabilized at any intensity by reducing the slurry to exactly critical size.

The reaction tank, for better utilization of the heavy water, may be hemi-spherical in form with a cylindrical upper portion joined thereto and in which the level of the slurry is varied between upper and lower limits on either side of the level corresponding to critical size. The preferred semi-sphere radius is approximately 7.5 feet, the cylindrical portion being 6 feet in diameter at the point of junction with the semi-sphere for the desired slurry concentration given above. We will describe in the following pages two preferred designs of chain reacting systems, one having a cylindrical reaction tank and the other a semi-spherical tank as above defined referring to various equivalent or preferred auxiliary apparatus for the operation thereof.

While the apparatus made in accordance with our invention may be cooled in any one or more of the ways shown in connection with FIGURES 2 to 5, the particular embodiments of our invention will be described with particular reference to a combination of cooling systems, such as shown in FIGS. 2 and 3. Referring to FIGS. 7 to 10, inclusive, and particularly to FIG. 7, the reaction tank 1 containing the slurry 2 is of stainless steel and is supported within an auxiliary enclosing tank 50 containing water 52 introduced therein by pipe line 51 for cooling the external surface of the tank 1 and other auxiliary apparatus to be described. The internal surface of the tank 50 is lined with lead sheathing 100 to absorb gamma rays liberated by the neutron chain reaction developed in the tank 1 and is surrounded by a massive concrete wall or shield 101 supported on a concrete base 102. This shield is for the purpose of absorbing and limiting the escape of gama rays not absorbed by the water 52 and the lead sheathing 100. Water 52 serves as a cooling medium, as a neutron reflector, and also as a neutron shield. Neutrons striking water body 52 are reflected back into the reactor or are absorbed. In this connection water is found to be an especially effective shield due to the low migration path of neutrons therein since the heat exchangers may be placed close to the reactor without substantial entry of neutrons into the circulating suspension in the exchanger and consequent fission therein. However, other neutron reflectors, such as deuterium oxide or carbon, may be used if desired. The concrete shield also serves as an absorber for neutrons slowed by collision in passing through the water 52 and is preferably composed of materials holding a maximum of water. The entire structure is supported on the earth which serves as an auxiliary shield at the base of the apparatus since the concrete base 102 need not be as thick as the side walls of the shield 101. Likewise, the lead shield 100 over the side walls and top of the enclosing tank 50 may be omitted on the bottom thereof.

Surrounding the reaction tank 1 we provide means to withdraw heat therefrom, such as by a heat exchanger system, all components of which are of materials such as steel having relatively low neutron absorption danger coefficients, so that particles abraided therefrom will not materially affect the chain reaction. We have shown six heat exchangers 5 in the drawings although it will be appreciated that any other number may be utilized depending entirely upon the rate at which the reaction is carried forth. Each of the heat exchangers 5 is connected with the reaction tank 1 through inlet piping 103, valve 104, and pump 4 near the top thereof and near the base thereof through the outlet valve 107 and piping 108 so that the slurry 2 may be circulated up through the reaction tank 1 and down through the heat exchangers 5. The heat exchangers 5 are cooled by water introduced near the base of the exchangers through the piping 6 and vented near the top thereof through the outlet 7 into the enclosing tank 50 where it merges with the water 52. The cooling water flowing through the heat exchangers as well as the water introduced through the pipe line 51 may be vented from the system through a channel 109 which completely surrounds the enclosing tank, being finally drawn off in the line 105, gases that may result from decomposition of the water 52 being vented through a shielded line 115 to a waste stack not shown. The piping between the reaction tank 1 and the heat exchangers, as well as the internal construction of the heat exchangers, is so designed as to minimize the amount of slurry held over during the heat exchange cycle inasmuch as the heavy water moderator comprising one of the ingredients of the slurry is at present relatively expensive. While the heat exchangers could be located outside of the concrete shield 101, such positioning would increase the slurry holdover while still necessitating additional radiation shielding enclosing these portions of the system.

Figure 7:
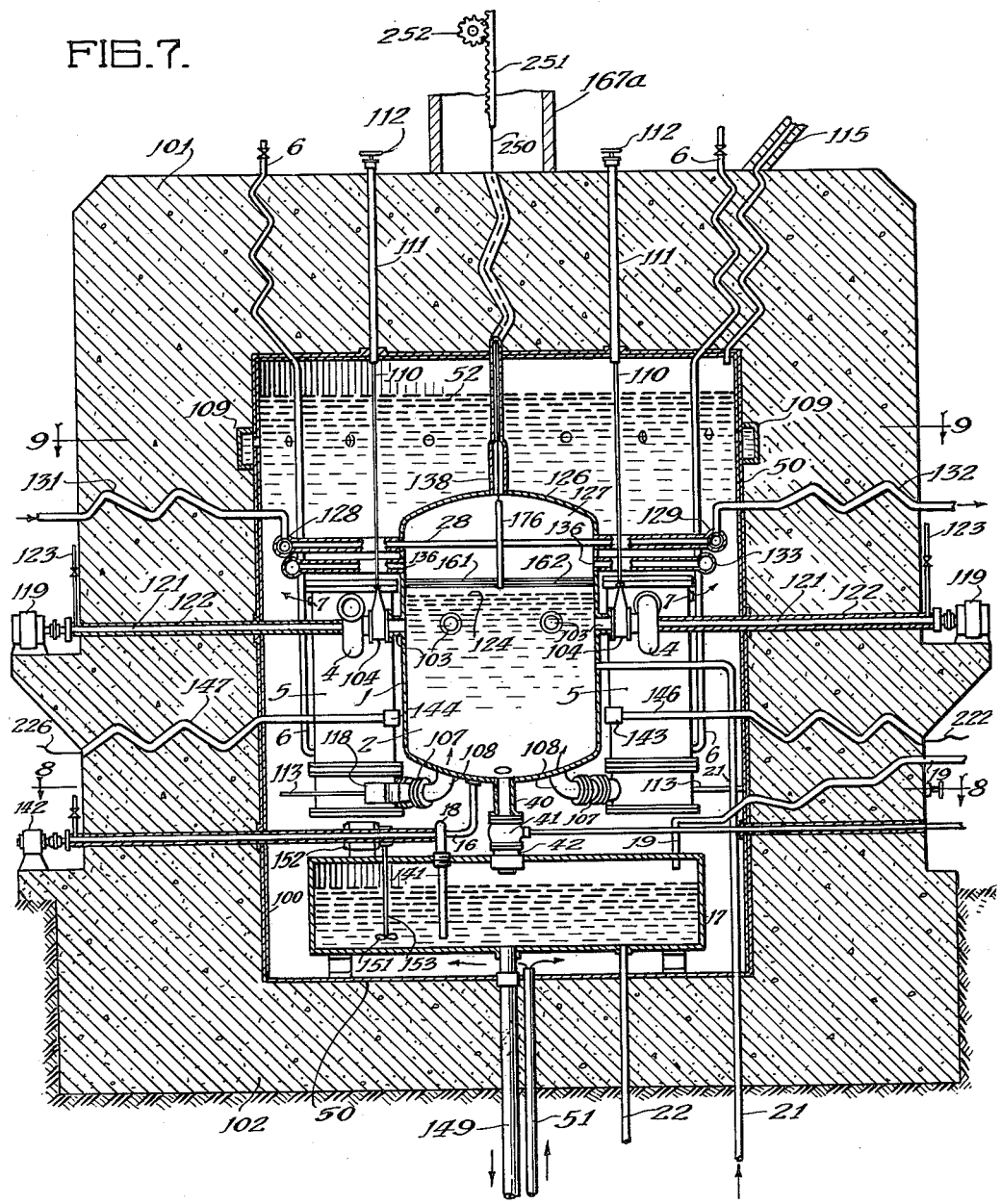
FIG. 7 is a vertical sectional view of one embodiment of our invention showing the principal features of our nuclear chain reacting system.
Figure 8:
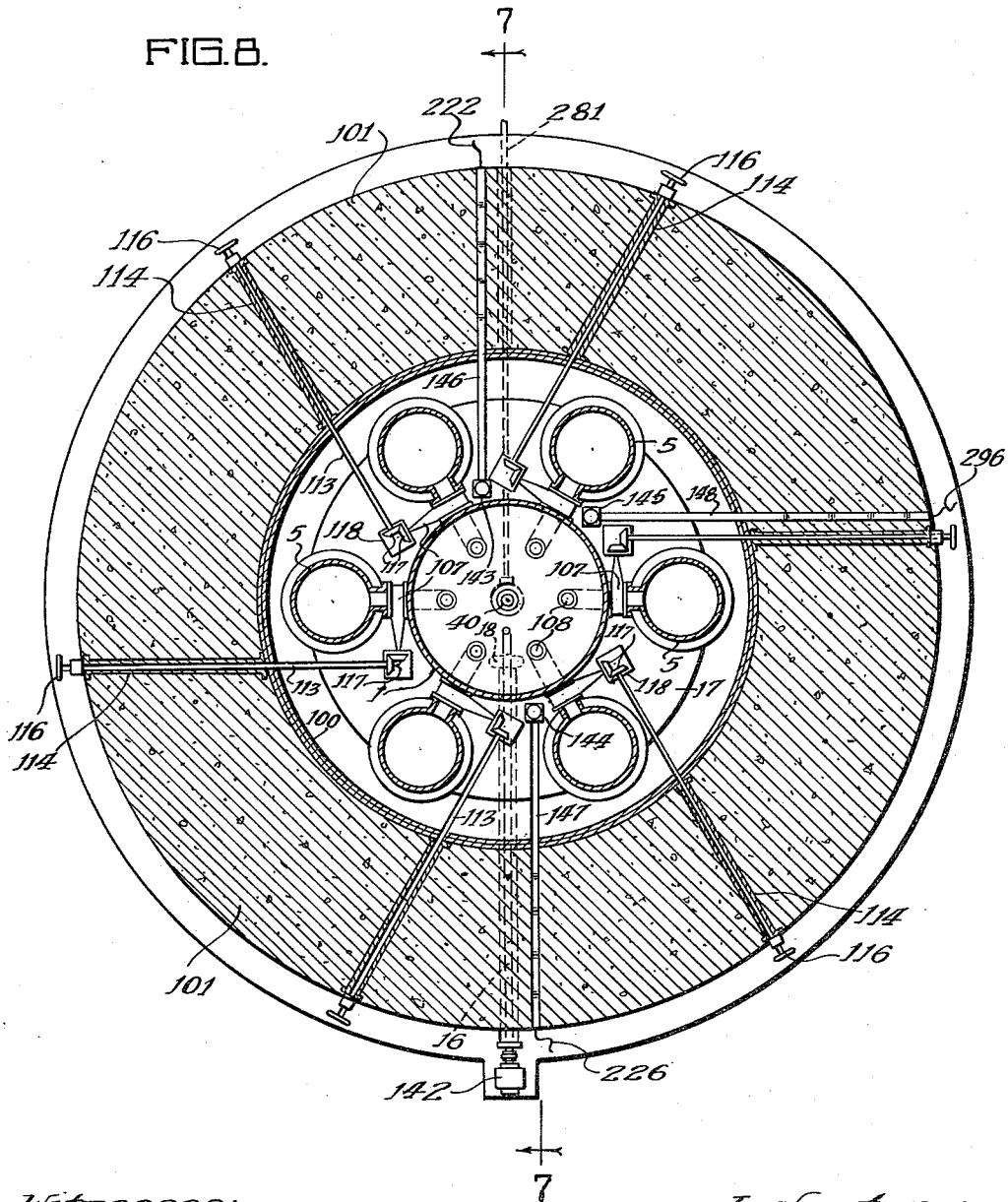
FIG. 8 is a cross-section view of the apparatus shown in FIG. 7 taken on the line 8—8 thereof.
Figure 9:
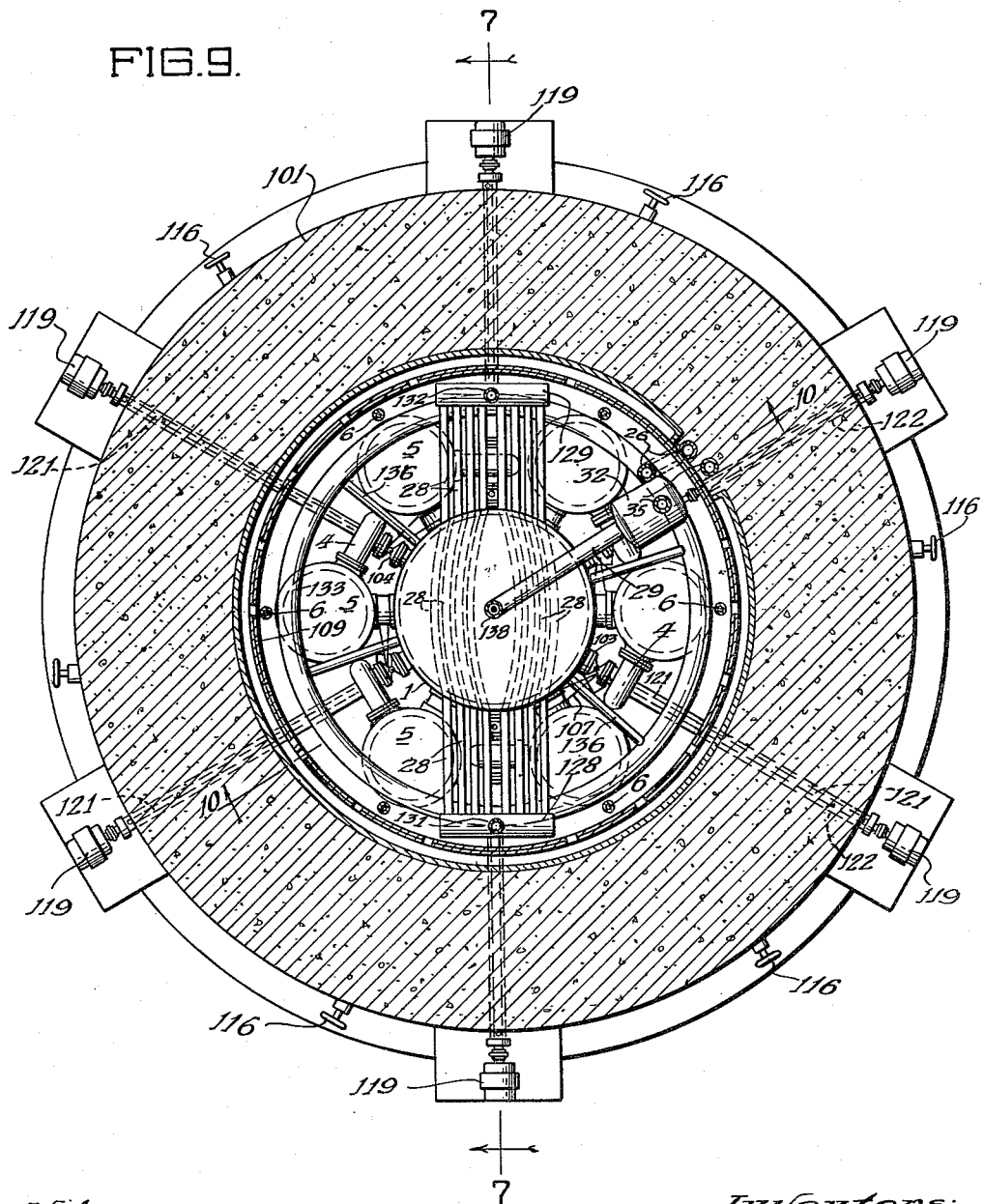
FIG. 9 is a sectional view similar to FIG. 8 taken along the line 9—9 of FIG. 7.

As best shown in FIGURE 7 the heat exchanger inlet valves 104 are controlled by rod type valve stems 110 extending in an upward direction through close fitting iron guides 111 extending through the concrete shield 101 terminating in hand wheels 112 to actuate the valves. The valve stems 110 are made close fitting with the guides 111 to minimize radiation leakage through the concrete shield. The outlet valves 107 in the pipe lines 108 between the heat exchangers 5 and the reaction tank 1 are similarly controlled through valve stems 113 extending in a horizontal direction through guides 114 imbedded in the concrete shield 101 to hand wheels 116. The connection between the valve stems 113 and the valves 107 is facilitated by bevel gearing 117 housed within the gear boxes 118 closely adjacent the valves 107 as best shown in FIG. 8. The slurry circulating pumps 4 are shown of the centrifugal type and are driven by motors 119 through shafts 121 extending from the pumps 4 to the outside of the shield 101 through closely fitting conduits 122. The motor bearings are lubricated and leakage is prevented by filling the conduits 122 with heavy water introduced therein through the piping 123. Such lubrication assures satisfactory bearing life, prevents loss of slurry into the external cooling water and prevents contamination of this water with fission products produced by neutron bombardment of the uranium in the slurry.

The reaction tank 1 is so designed that under normal operating conditions the slurry level 124 is considerably below the top portion 126 of the tank 1 leaving a gas chamber 127 therein. Under the high neutron intensity present in the slurry volume, some of the heavy water moderator of the slurry becomes decomposed, the dissociated, i.e., uncombined, gases rising through the slurry 2 into the chamber 127 above the normal slurry level. In accordance with our invention, we provide means within the reaction tank 1 to recombine the gases formed by decomposition of the heavy water. We have shown a grid 28 of tubular members connected between an inlet header 128 and an outlet header 129. Hot gas is admitted through the line 131 to the inlet header 128, passed through the grid 28 and removed from the header 129 through an outlet line 132. In this manner the grid 28 is maintained above the recombining temperature of the uncombined gases of the heavy water. However, to prevent high concentration of uncombined gases within the chamber 127 we circulate an inert gas such as helium, which has a low neutron capture cross-section, through the chamber to dilute these gases and thereby prevent the formation of an explosive mixture. More particularly, as shown in the drawings, we provide a circular header 133 surrounding the reaction tank 1 about the chamber portion 127, this header being fed with helium which flows into the reaction tank through a plurality of ducts 136 which enter the tank 1 through the periphery thereof, thereby diluting the dissociated gases and driving them over the hot grid 28. To assure a complete recombination of the heavy water gases we provide, in addition to the hot grid 28 which burns the majority of these gases to heavy water, a charcoal platinum catalyst 137 within a chamber 29 connected to the top of the reaction tank 1 through a bell-shaped housing 138. The catalyst 137 may be of platinized charcoal supported within the chamber 29 in the presence of which the hot gases recombine with the evolution of additional heat to form heavy water vapor. This vapor is then directed by the flow of helium into a heavy water condenser 32, which in the modification shown in FIGS. 7 to 10 is cooled by the water 52 in the tank 50. The helium from which the water has been separated by condensation is withdrawn from the system through the line 35 and passed to the purifying system previously described in connection with FIG. 1.

The normal level 124 of the slurry is attained by provision of the slurry in reservoir 17 which may be pumped into the tank 1 by the pump 18 having a suction line 141 extending substantially to the bottom of the reservoir 17, the pump 18 being connected to the bottom of the reaction tank 1 by a line 16. The pump 18 is driven by a reversible motor 142 controlled in accordance with the neutron density in the reaction tank as determined by an ionization chamber 143 positioned adjacent the tank 1 so as to be in a region of relatively high neutron density. Additional ionization chambers 144 and 145 are provided as safety control units, their operation being described in greater detail hereinafter. Each ionization chamber has shielded leads 146, 147 and 148, respectively, extending through the concrete shield 101 for connection to the external control circuit shown in FIG. 12.

It is one of the principal objects of our invention to provide means for continuously removing portions of the slurry for recovery of the newly created elements 93 and 94 as well as the fission products. The concentration of these products of the nuclear reaction may be determined easily after operation for a predetermined time and the concentration of these products maintained constant in the slurry by bleeding off small quantities of the slurry while the chain reaction is continuing. No loss of operation time ensues by this method of removing the products. In prior systems using massive uranium rods or other shapes, it was necessary either to stop the nuclear reaction to remove the uranium or to provide complicated equipment to replace the processed uranium with new uranium for processing. However, in our system portions of the slurry containing the new elements 93 and 94 may be withdrawn from the tank 1 directly through the line 8 as shown in FIG. 1 or from the slurry reservoir 17 through the line 149, FIG. 7.

Inasmuch as solid uranous material in the heavy water moderator in the form of a slurry is more dense than the moderator and tends to settle through the moderator, we provide an agitator 151 immersed in the slurry in the reservoir 17 driven by the motor 152 through the shaft 153. Such agitation of the slurry within the reaction tank 1 may be unnecessary, however, where the circulation through the heat exchangers provides sufficient turbulence to maintain the material in suspension, or where the particle size of the uranium composition is so small that very little settling occurs. At all events the slurry or solution concentration within the reactor should not change substantially during reaction, and, if possible, localized over or under concentration should be avoided to avoid localized hot spots.

We have shown several safety features incorporated within the reaction tank 1 to control the chain reaction to within safe limits as determined either from original design of the apparatus or in accordance with measured neutron intensities during operation. As indicated above, increase in the slurry volume within the reaction tank 1 beyond a predetermined amount may result in a reaction which increases beyond safe limits. Consequently, in accordance with our invention, we provide a safety feature within the reaction tank comprising a plurality of parallel cadmium plates 161–162 which may be perforated, if desired, in a position slightly above and parallel to the maximum desired slurry level so that upon any increase in volume either by failure of control or by expansion of the slurry volume the plates become immersed in the slurry whereby any uranium-heavy water mixture above the plates is removed from the chain reaction volume because cadmium absorbs neutrons originating in the main mass of the slurry. The cadmium plate 161 contains perforations 163 to allow escape of gases liberated within the slurry into the region 127 above the normal slurry level as well as to admit the slurry into this region for abnormally high slurry levels. The cadmium plate 162 is likewise apertured at 164, these apertures being offset from the apertures 163 in the plate 161. Such construction minimizes the number of slow neutrons escaping from the slurry into the upper gas chamber 127 of the tank 1, and, while fast neutrons may pass through the cadmium plates, slow neutrons capable of contributing directly to fission will be substantially prevented from entering the chamber 127. Any increase in volume of the slurry level above the normal level 124 into the chamber 127 will consequently remove this volume from that in the lower portion of the reaction tank with respect to its action in sustaining the chain reaction. Thus, while the reaction will not be terminated, the rate of rise in the reaction will not be as great and the reaction may be controlled more easily.

The plates 161–162 may be supported in such a manner that their position may be varied in a vertical direction within the reaction tank. Referring to FIG. 11, we have shown the plates 161–162 as being connected together as by welding, bolting, or riveting at 166, and supported by rods 167 which extend through the top of the reaction tank 1. Other details of the reaction tank have been omitted for the sake of clarity. The support rods 167 are slidably mounted in thimbles 168 affixed to the top of the reaction tank 1 and extend through closely fitting conduits 169 in the concrete shield 101 to the exterior thereof, terminating in racks 171 engaging pinions 172 which may be rotated by cranks 173 to lower or raise the plates 161–162 and thereby adjust the plates with respect to the normal slurry level 124. As illustrated in FIGURE 7, the operating mechanism outside the shield is enclosed in a gas tight space defined by walls 167a.

In addition to the provision of the cadmium plates 161–162, we provide a safety rod 176 also within walls 167a supported above the slurry 2 and immersible therein should the neutron reaction suddenly increase in density to a point approaching a dangerous condition. The safety rod 176 preferably protrudes through the cadmium plates 161—162 into close proximity with the normal slurry level 124 so that any sudden increase of slurry volume would cause a partial immersion of the safety rod 176 into the slurry. The safety rod is of a material having a high neutron capture cross-section such as boron, cadmium, gadolinium, or other material having high neutron absorption characteristics and when immersed in the slurry reduces the reproduction ratio below unity, thereby terminating the reaction. Alternatively, or as an emergency, the slurry may be dumped from the reaction tank 1 as previously described through one or more dump lines 40—42 joined by the dump valve 41. The preferred control will be described below.

We have shown the safety rod 176 as being suspended over the upper maximum level of the slurry in the reaction tank 1 and within the space between the cadmium plates 161—162 and the top of the reaction tank. In this region the safety rod 176 is subjected to only a low density of slow neutrons to which the safety rod is very absorbent. Neutron absorbers inserted into the slurry are subjected to high neutron densities and they cannot continue to absorb neutrons indefinitely. The continued absorption of neutrons by the absorbing material causes transmutation of the absorbing materials and an element or isotope may be built up within the material which has a smaller neutron capture cross-section than the original material. However, by maintaining the safety rod within the space above the cadmium plates 161—162, this reduction in efficiency of neutron absorption is reduced to a minimum. Consequently, unless the safety rod is left immersed in the slurry, such as may occur if it is used to control the reaction rather than obtaining control by variation of the slurry level, the rod will retain a long effective life and may be depended upon as a positive safety feature. The ultimate safety feature, however, namely the dumping of the slurry through the valve in the base of the reaction tank is independent of this neutron absorption and consequently, may be depended upon as a positive safety feature.

All possible precautions must be taken to prevent an abnormal rise in the slurry volume in the reaction tank and a consequent exponential rise in neutron density either in the case of failure of the cadmium plates 161—162 to provide an adequate control with increase of slurry volume or of the safety rod 176 to become effective in reducing the neutron density to a point where the reproduction factor is equal to or less than unity.

Reference is made to FIG. 12 which shows diagrammatically one form of control and safety circuit which we may use for regulating the output of the system. Referring first to control circuit A, the control ionization chamber 143 referred to above as being placed adjacent the reaction tank 1, is provided with a filling of boron fluoride. A central electrode 221 is provided within the chamber 143 and connected to the wire 222 leading outside of the system enclosed by the concrete shield 101, shown in FIG. 7, to a movable contact 223 on the resistor 225. Resistor 225 is connected across a relay coil 226, one side of which is connected to the battery 227, the other of which is connected to the shield 146 around the wire 222. The shield 146 is grounded preferably at 230 adjacent the end of chamber 143 as well as externally of the system as shown at 231. The tank 1 is permeable to neutrons developed within the slurry 2 and alpha ray ionization due to neutron reaction with the boron within the chamber 143 is proportional to the neutron density. Thus, the current in resistor 225 is varied in accordance with neutron intensity reaching the ionization chamber. Relay coil 226 operates a relay armature 232 which is spring biased by spring 233 to contact one motor-control contact 234, and is urged by current in the relay coil 236 to contact a second motor control contact 237. Contacts 234 and 237 connect to the outside of a split winding of the reversible motor 142 through lines 238 and 239, the center connection 241 of which is connected through power mains 243 to the armature 232. The motor 142 operates shaft 245 directly connected to the reversible pump 18. The pump 18 is connected between the reaction tank 1 and the reservoir 17 through the suction line 141 as previously described. In operation of the system the pump 18 varies the level 124 and consequently the volume of the slurry 2 in the tank 1 between predetermined upper and lower limits on either side of the critical size at which the reproduction ratio is unity.

Having described a circuit for controlling the volume of the slurry, we will now describe its operation considering the condition obtaining when the volume of the slurry 2 in the reaction tank 1 is insufficient to support a self-sustaining nuclear chain reaction. The slider contact 223 on resistor 225 is calibrated in accordance with the neutron activity of the slurry. The slider contact 223 is then set in advance corresponding to the desired neutron density at which the system is to operate. While the ionization chamber does not indicate directly the maximum neutron density (i.e., at the center of the body of slurry) within the reaction tank, the ratio of maximum to measured density (the measured density being that at a point, say, just outside the tank) is a known ratio for all operating neutron densities within the reaction tank 1. For a low volume of slurry within the tank 1, the neutron density is much lower than the desired maximum neutron density and the relay coil 226 will not receive enough current to operate the armature 232 since very little ionization takes place within the ionization chamber 143. Consequently, the armature 232 will rest against the contact 234 driving the motor 142 in a direction pumping slurry from the slurry reservoir 17 into the reaction tank 1. However, as the volume of slurry within the tank 1 increases and exceeds the critical volume at which the neutron reproduction ratio is greater than unity the neutron density will rise until the ionization in the chamber 143 becomes so great that at the maximum desired neutron density the armature 232 is drawn into rest with the motor contact 237. Motor 142 is thus energized to reverse the pump 18 and withdraw slurry from the reaction tank 1 into the reservoir 17. The motor 142 will continue to operate until the volume of the slurry 2 in the tank 1 falls to a point at which the reproduction ratio of the chain reaction is less than unity whereupon the neutron density will commence to fall and eventually due to the lower neutron density and lower ionization in the chamber 143, the armature 232 again rests against the contact 234 and the motor 142 is reversed to pump again the slurry into the reaction tank 1. The volume of the slurry 2 in the tank 1 will thereafter hunt between upper and lower limits on either side of a volume corresponding to the critical size of the reaction system. Thus, the volume will vary between a point above the balance position at which the neutron density rises exponentially and a point below the balance position where the neutron density decays, providing an average neutron density within the reaction tank as determined by the setting of the sliding contact 223 on the resistor 225. As the mass of the slurry in the reaction tank causes any temperature change to lag behind any neutron density change, the temperature of the slurry is maintained substantially constant. If desired, any of the well-known anti-hunting circuits may be utilized as will be apparent to those skilled in the art.

It should be distinctly understood that the control circuit A cannot be likened to a throttle control. The rate at which the reaction occurs is not dependent upon the volume of the slurry but rather upon the neutron density attained after exceeding critical size and before decrease to critical size. For example, upon increase beyond critical size the neutron density would continue to increase exponentially with time irrespective of the cooling capabilities of the circulating and heat exchange systems. Control is, therefore, effected by controlling the volume above and below the critical size to maintain a desired neutron density and by decreasing the volume below critical size to decrease the neutron density.

Due to the fact that it might be possible for the control circuit as described to fail, and thereby leave the volume of the slurry at such a high level that the neutron density would continue to rise indefinitely notwithstanding the presence of the cadmium plates 161—162 and the safety rod 176, we prefer to provide a safety circuit which may be brought into action either manually in response to abnormal operating conditions or automatically in response to neutron densities within the pile exceeding the predetermined setting of the sliding contacts 223 on the resistor 225.

One such illustrative safety circuit is shown in FIG. 12 at B. In the circuit B the safety rod 176 is supported over the normal slurry level 124 by a connection 250 to a toothed rack 251 engaging a pinion 252 attached to shafting 253—254 of a motor 256 through a magnetic clutch 257. The two shafts 253—254 are locked together by the magnetic clutch 257 when energized from the main power mains 259 in series with trip switches 261 which may be located at various safety control positions exteriorly of the concrete shielding. Upon failure of the power supply 259 which would deenergize the motor 142 possibly leaving the slurry level at a point at which the neutron density would continue to rise exponentially the magnetic clutch 257 is deenergized allowing the rack 251 to fall to a limiting position at the stop 262 and the safety rod 176 to be immersed in the slurry 2 in the reaction tank 1. The safety rod being of a material such as boron, cadmium, or other material having a very high neutron capture cross-section adds a controllable neutron loss to the system causing the reproduction ratio to fall below unity and the reaction within the tank 1 to decay in neutron density. The abnormal condition causing the high neutron density such as the power failure or the manual tripping of one of the switches 261 having been overcome, the safety rod may be withdraw to allow normal control to become effective by normal variation of the slurry volume within the reaction tank.

We prefer to combine automatic control of the safety rod with the manual or power failure control as also shown in the circuit in FIG. 12 at B. Thus we provide an additional ionization chamber 144 corresponding in construction and positioning to the chamber 143. As previously described in connection with circuit A the ionization chamber 144 is provided with wire line 266 connected to a resistor 267 by sliding contact 268 and with the battery 270 through the shield 147. The resistor 267 is connected across the relay coil 272 and to the other side of the battery 270. The circuit is completed by an armature 273 normally biased by spring 274 into rest with a contact 275 connected to the power mains 276 and thence to the motor 256 returning to the armature 273. The rotation of motor 256 is such that under normal operation, and when energized from the mains 276, the pinion 252 is rotated through the magnetic clutch 257 and shafting 253—254 to raise the rack 251 into a position of rest in contact with stop 277 thereby raising the safety rod without the slurry volume in the reaction tank 1.

The motor 256 is so designed as to slip electrically when the rack 251 is in contact with the stop 277 and the weight of the rack 251, line 250, and safety rod 176 are counterbalanced through the magnetic clutch 257 by weight 280 attached to the periphery of a pulley 281 mounted on the extension 282 of the shaft 254 to reduce the load on the motor.

However, under abnormally high conditions of neutron density within the tank 1, the current in the relay coil 272 increases to such a value that the armature 273 is withdrawn from its position of rest on the contact 275 thereby deenergizing the motor 256 allowing the pinion 252 to rotate dropping rack 251 into contact with stop 262 and safety rod 176 into the slurry 2 in the reaction tank 1. Consequently, by adjusting the sliding contact 268 on the resistor 267 to a position corresponding to a neutron density somewhat higher than the desired maximum, at which the slider contact 223 is set on the resistor 225, the safety system may be brought into control at high neutron densities which might be detrimental to the system.

However, as an abundance of caution and in view of the destructive explosion which might occur in the case of failure of the control and safety systems just described to stop the nuclear chain reaction a portion or all of the slurry may be dumped from the reaction tank in case of emergency. Thus, one or more dump valves such as the valve 41, located in the dump line 40—42 to the slurry reservoir 17 may be opened in emergency to reduce rapidly the volume of slurry in the reaction tank 1 to a safe level.

A circuit for accomplishing dumping is shown in FIG. 12 at C. The dump valve 41 can be used for this purpose by connecting the dump valve rod 281 to a dump counter weight 282 urging the dump valve to an open position. The dump valve is maintained closed by a dump latch 283 held in engagement with rack 284 on the dump valve rod 281 by relay coil 286 which, when energized, holds the lever arm 287 fulcrumed at 288 notwithstanding the weight 289. Latch 283 may be withdrawn manually by a handle 291. To maintain the latch 283 in engagement with rack 284 against the weight 289, the relay coil 286 is energized by battery 292 having a circuit completed through series emergency break switches 293 and contact 294 to a movable armature 296. A third ionization chamber 145 similar to those previously described, is provided having a wire line 296 running through shield 148 connected to the resistor 297 and to a sliding contact 298. The resistor is connected across the relay coil 299 and returned at 300 to the battery 301 and to the ionization chamber 145 through the shield 148.

In operation, the slider contact 298 is adjusted to a position on the resistor 297 corresponding to a maximum safe neutron density slightly above the density setting of resistor 267, circuit B, at which emergency dumping should occur. Under such conditions the magnetic mechanism operates to disengage latch 283 allowing weights 289 and 282 to open the valve 41. The slurry dumped from the reaction tank 1 is not lost but led to the reservoir 17 from which the tank 1 may be replenished by the pump 18 upon manually closing the dump valve 41 for reinitiation of the nuclear chain reaction in the reaction tank.

Other measures may be used to assure complete safety in the operation of the system. Remote recording thermometers should be provided in the inlet 6 and outlet 7 cooling water lines of the heat exchangers 5 as well as remote recording flow meters to determine cooling water flow both in the heat exchanger systems as well as in the water supply line 51 filling the tank 50 in which the reaction tank 1 is immersed. These as well as other controls are dictated by conventional engineering practice and need not be considered in detail except to point out that safety controls operated, for example, by excessive temperature rises or insufficient cooling water flow may be utilized to stop the nuclear chain reaction either by insertion of the neutron absorbing safety rod or by dumping the slurry into the slurry reservoir tank.

To place the system in operation, the slurry reservoir 17 is supplied with sufficient slurry to fill the reaction tank to critical size volume whereupon the slurry is pumped into the reaction tank, by starting the slurry circulation pumps followed by adjusting the flow of the cooling water through the heat exchangers surrounding the reaction chamber. The helium supply to flush the gases produced by decomposition of the heavy water moderator is then adjusted to maintain helium pressure in the reaction tank such that for a temperature rise to 120° C. the moderator will not boil. The control circuit A is then set for a neutron density corresponding to about a 70° F. rise in temperature within the reaction tank and to keep the temperature of the slurry at the intake to the slurry circulation pumps at a safe level. The safety circuit B and emergency circuit C are then set to shut down the system in case of any substantial rise in neutron density through failure of the circulating system or power supply.

While the pumps and heat exchangers could be located on the outside of the concrete shielding walls, such position would increase the hold over while still necessitating additional shielding enclosing these portions of the system, because after the initiation of the action the uranium in the slurry becomes very radioactive. For example, the fission products created by fission of the $U^{235}$ produce considerable alpha, beta, and gamma rays which must be absorbed for the safety of operating personnel. Consequently, and inasmuch as the entire apparatus within the shield comprising the concrete walls and the lead lining of the tank becomes radioactive, it is impractical following initiation of the reaction and maintenance of high neutron density within the reaction tank to service or otherwise adjust or rebuild the moving parts within the shield. For example, in the structure shown in FIGS. 7–10, it would be extremely difficult to repair or replace the pump 4 although servicing of the driving mechanism for these pumps is facilitated by placing the driving motors exteriorly of the concrete shield.

In view of the present cost of heavy water moderator, it is desirable to reduce the amount used to a minimum. This may be accomplished by reducing the amount outside the active portion of the system and by utilizing an optimum concentration of uranium-containing material. At the same time, however, a substantial quantity of the suspension or solution must be circulated through the heat exchangers in order to secure rapid and efficient removal of heat from the reactor. We have found that most efficient removal of heat or energy per unit weight of slurry or solution may be secured by using a circulation system of a size such that the amount of suspension or dispersion in the circulation system is about 2 to 6 times the amount of such suspension undergoing neutron chain reaction in the reactor. Maximum utilization may be secured by circulating the suspension through cooling tubes having an internal diameter of 3/8 to 5/8 inch. We have shown the heat exchangers as being as close to the reaction tank as possible to thereby minimize the length of piping carrying the heavy water slurry and also to enable a saving of delayed neutrons as described hereinafter. For a given number of heat exchangers more heat may be removed from the system by using a higher temperature of the circulating slurry, although increase in temperature decreases the reproduction ratio somewhat. The gain in increased heat transfer, however, more than compensates the slight increase in slurry volume then necessary to obtain a reproduction ratio of unity, until boiling of the heavy water occurs. In general, in the preferred type of reactor herein described, boiling of the moderator should not be permitted since the resulting formation of bubbles in the moderator makes this type of reactor very difficult to control. It is thus economically desirable with respect to heavy water utilization, to operate at a temperature below boiling. The utilization may be increased still further by operating the system at a maximum slurry temperature above the normal boiling point, preventing boiling by an increase in pressure. Thus, a pressure greater than that corresponding to a maximum slurry temperature of 120° C. is preferred notwithstanding the necessity for providing a system capable of withstanding the increased pressure. Consequently, we prefer to provide the reaction tank 1 of such construction to withstand an internal pressure of from 100 to 150 pounds per square inch, the slurry reservoir, connecting piping and heat exchangers being designed to withstand a similar pressure. Control of operating pressure is preferably accomplished by pressure control of the helium atmosphere provided to sweep the dissociated heavy water gases over the hot grid, across the catalyst chamber and the vapor into the heavy water condenser.

While we have shown a system incorporating six heat exchangers surrounding the reaction tank, a different number may be used depending upon the maximum or minimum rate of heat dissipation desired. Preferably, a greater number of heat exchangers and associated pumps than the desired minimum capacity is installed inasmuch as pump or exchanger failure necessitates their removal from the system by closing their associated valves. Thus, following initiation of the nuclear reaction radioactive fission fragments will become lodged in the pumps rendering them exceedingly radioactive. Repair or replacement is impractical and the number initially installed must be sufficient to allow for standby in case of failure or for operation at reduced operating levels with failure of one or more of the circulating systems. Furthermore, as previously indicated, savings in the quantity of slurry required to initiate a self-sustaining chain reaction may be obtained by use of a spherical or semi-spherical reaction tank.

Figure 13:
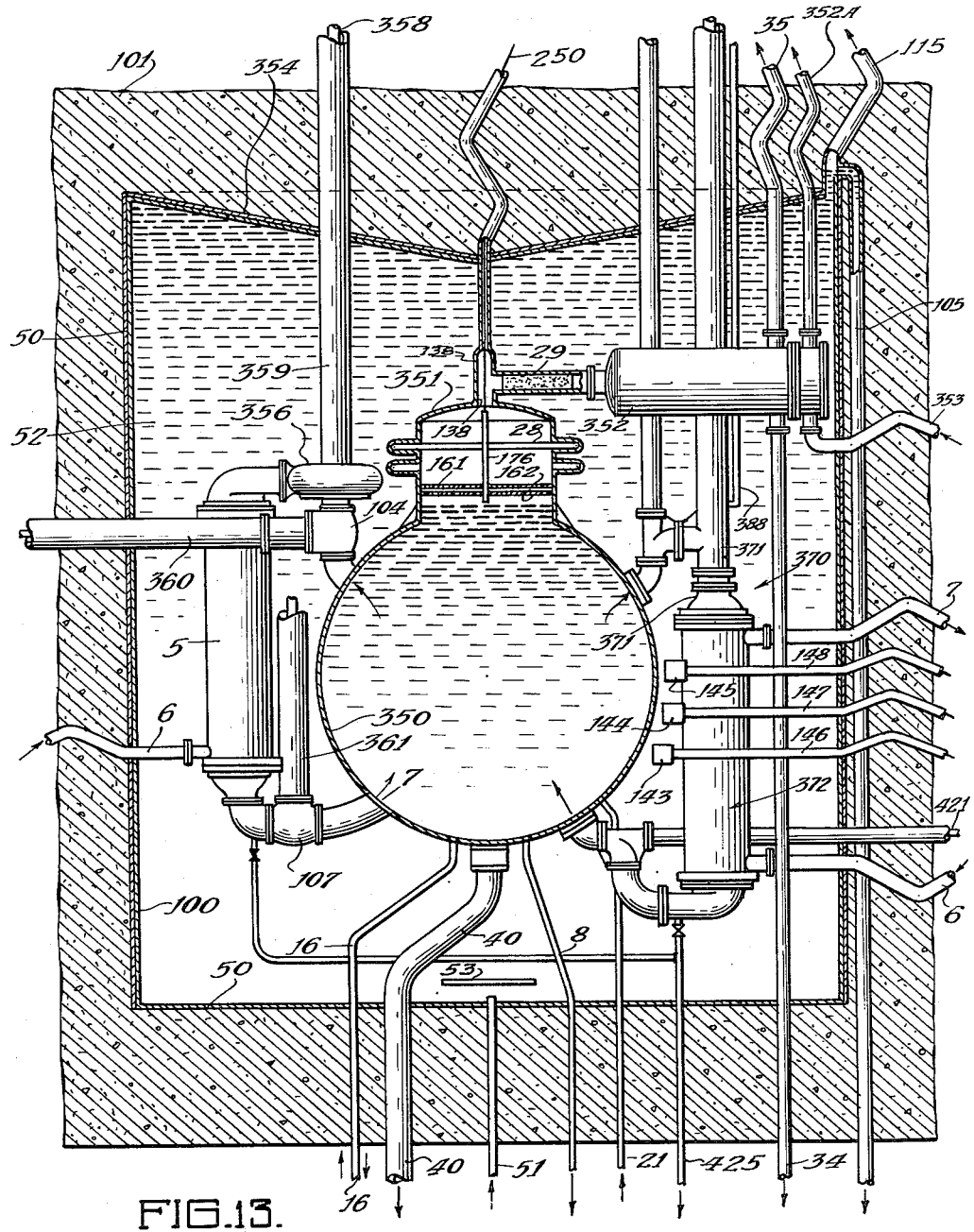
FIG. 13 is a fragmentary view similar to that of FIG. 7 showing another physical embodiment of our invention.

We have shown in FIGS. 13–15 a further structural embodiment of our invention wherein the reaction tank is semi-spherical in combination with two types of circulating systems one of which is particularly adapted to the replacement of the working parts.

Referring to FIGS. 13–14, we have shown in schematic outline the principal features of a self-sustaining nuclear reaction system utilizing a semi-spherical reaction tank 350, surmounted by a cylindrical tank portion 351 in place of the cylindrical type of structure previously described. With this type of reaction tank, the slurry volume required for a self-sustaining reaction is considerably less, as previously noted, in comparison with the slurry requirements for a cylindrical structure. The cylindrical tank portion 351 encloses the cadmium plates 161—162, the hot grid 28, and the safety rod 176 previously described and is surmounted by a bell-shaped enclosure 138 leading off from which is the catalyst chamber 29, leading in turn to the condenser 352. The condenser 352 is additionally cooled, not only by the water 52 in the enclosing tank 50, but also by additional cooling medium circulated within the condenser 352 such as through an inlet line 353 and an outlet line 352A. We have likewise shown in FIGS. 13 and 14 tank 50 as being provided with an inwardly extending conical top 354 with a water outlet 105, as well as an outlet 355 for escape of dissociated gases from the water 52 within the tank 50. Such construction assures cooling of the top portion of the tank 50 as well as equalization of temperatures in the top and side portions of the concrete shield 101.

We have shown only two slurry circulating and heat exchange systems in FIG. 13, these being shown as of different types merely for the purpose of indicating flexibility of the system. Obviously, additional circulating and heat exchange systems may be utilized to increase the heat dissipating capacity of the system. Referring in particular to FIG. 13, the heat exchanger 5 is similar to those previously described, although the slurry circulating pump 356 is positioned with its axis vertically so that the drive may be from the top of the concrete shield 101 by a motor 357 having a shaft 358 extending through the casing 359 to the pump 356. The valves 104 and 107 are of the type previously described except provided with housings 360—361, which extend outside of the concrete shield 101 to corresponding hand driven or motor driven controls. By use of the housings 360—361, leakage around the packing glands of these valves may be minimized or prevented by maintaining a helium pressure equal to or slightly exceeding the helium pressure maintained in the cylindrical tank portion 351, as later described. Inasmuch as it is impractical to repair or otherwise adjust the types of circulating pumps previously described, we have shown a construction in FIG. 13 wherein the pump shaft and impeller assembly may be withdrawn from the system for repair or replacement. Reference is made to FIGS. 13 and 15 which show an axial circulating pump generally designated at 370. The pump housing 371 is connected directly to the upper end of the heat exchanger generally designated as 372. The housing 371 encloses an impeller 373 mounted on a shaft 374, the housing likewise enclosing directing vanes 376 immediately below the impeller 373. A second impeller 377 is mounted on a flanged hub 375 splined to the shaft 374 above the impeller 373 to maintain the slurry in the pump housing 371 below the bearing assembly. Inasmuch as the slurry, especially in the initial stages of operation of the system, may be abrasive in character, if not initially run-in, we take special precautions to prevent its coming in contact with the bearing surfaces by providing a structure such as shown in FIG. 16. Referring to FIG. 16, the shaft 374 extends axially of the pump housing 371, being supported by the bearing 378 which is lubricated through the lubrication line 379 carrying an inorganic lubricant since organic lubricants tend to be unstable to high neutron densities. The bearing is supported within the housing 371 by a sleeve liner 380 extending axially of the housing 371 to the outside of the concrete shield 101 as shown in FIG. 17. This construction allows the complete removal of the impellers and bearing assembly, either for replacement or repair. Between the bearing 378 and the top impeller 377, we apply labyrinth splash and vapor seals between an integral flange 381 extending in a direction toward the shaft 374 on the lower end of the housing liner 380, and the bearing 378. The flange 381 is positioned parallel with and slightly below a flange 382 integral with the impeller hub 375, shaft 374 being surrounded by a cylindrical member 383 having an integral flange 384, the periphery of the integral flange 384 being affixed to the housing liner 380. Rotation of the flanged hub 375 between the flanges 382—384 serves as an effective splash shield to prevent any upward creeping of the slurry in the pump. Creepage of the slurry along the shaft 374 may be further limited and vapor sealed from the bearing by use of a liquid seal. Mercury 385 may be introduced in the chamber formed by the liner 380 and the cylindrical flange member 383, with a telescoping cup-shaped member 386 affixed to the shaft 374, inverted in the mercury, and surrounding the cylindrical member 383. In this manner the assembly is effectively sealed both with respect to the slurry in the casing and with respect to any vapors or gases which may be released from the slurry. To further protect the bearing 378, helium may be admitted to the pump casing 371 through a line 388 and maintained at a predetermined pressure with respect to the helium in the cylindrical portion 351 of the reaction tank 350 to maintain the slurry level well below the top impeller 377.

In the structure just described, it is necessary to provide a casing surrounding the circulating pump shaft which is of relatively large diameter to allow the shaft and impeller to be withdrawn. Consequently, considerable opportunity exists for neutron and gamma ray leakage through the concrete shield interiorly of the pump casing liner. As best shown in FIG. 17, we provide a labyrinth of gamma ray absorbing material to prevent the escape of direct radiation from the system. This labyrinth comprises a plurality of axially separated rings 391, snugly fitted to and stationary with the liner 380, and having therebetween additional rings 392, snugly affixed to the shaft 374. The rings 391—392 are of iron or other dense metal and overlap one another forming a labyrinth or tortuous passage preventing the escape of gamma rays except directly through the metal. Since gamma rays are radiated to best advantage along straight line paths, the members 391 and 392 are interposed in the path of gamma radiation causing the major portion thereof to be absorbed in these members. These members, however, are not completely effective shielding for neutrons and consequently, we prefer to fill the casing with lubricant through the line 379 which extends to the bearing 378, this lubricant being withdrawn through the line 394. The lubrication lines 379 and 394 are positioned between the rings 391 and the liner 380 adjacent the inner surface of the liner. The lubricant used is preferably inorganic such as water although a hydrocarbon oil may be used since the mercury seal and positive helium pressure within the pump casing prevent contamination of the slurry with the lubricant, and the lubricant may be replaced through the lines 379 and 394 to compensate for deterioration under neutron bombardment. If water or hydrocarbon oil is used as a lubricant, the neutrons otherwise escaping through the pump drive casing are slowed by the hydrogen content and substantially absorbed thereby limiting their escape from the system.

The pump casing 371 is joined to the reaction tank 350 somewhat below the normal slurry level 401, through a valve generally designated 402 and inlet line 430. Following initiation of the reaction within the tank 350 substantially the only occasion for closing the valve 402 is in the event of failure of the circulating system, such as by leakage occurring in the heat exchanger 372. Inasmuch as it is impractical to repair any portion of the apparatus within the concrete shield following the operation at high neutron density only a single operation of the valve 402 is required. The valve must, therefore, be positive in its section, must be of such a design as not to become closed by the slurry and must be substantially leakproof.

The valve 402 in FIG. 15 particularly meets these requirements in that it is of the plunger type having a valve stem 403 terminating in a cylindrical valve head 404 having two tapers 405 and 406 on opposite ends thereof. The taper 405 as shown is seated against the packing 407 in the withdrawn or valve-opened position, thereby effectively preventing leaks while open. In this position, the entire valve head 404 is withdrawn into a cylindrical channel 408 so as to be out of the path of the slurry passing through the valve. The valve throat 409 is of constricted cross-sectional area to increase the velocity of the slurry passing through this portion of the valve to maintain the valve seat 411 clear of any slurry particles which might be entrapped in the valve seat portion. The valve seat 411 is likewise tapered to conform with the taper 406 on the cylindrical valve head 404 so that in the closed position not shown, the valve head positively engages the valve seat 411 forming a liquid tight seal therewith. The valve 402 may be driven either electrically or by hand, although we have shown a hand wheel 412 engaging the valve stem 403 at the upper end thereof over a threaded portion 413.

A similar valve generally designated as 420 is of similar construction, although we have shown this valve disposed with its valve stem 421 horizontally and in a closed position showing the method of seating the valve head 422 upon the valve seat 423.

Upon failure of the heat exchanger or the development of leaks in the circulating system the two valves 420 and 402 may be closed and the slurry withdrawn from the circulating system through a drain at the lowermost portion of the system. For example, a drain 425 may be provided in the casing 426 joining the valve 420 with the condenser 372. The drain may be placed in operation by a valve shown schematically at 427 operated, for example, through the concrete shield 101 from the side thereof.

In FIG. 18, A, B, and C represent individual particles of material containing natural uranium, but it is to be distinctly understood that the entire chain may take place in one body, two bodies, or three, as shown, because of the fact that the neutrons during the slowing down process are diffusing over random paths throughout the entire composite mass of the slurry, and are not necessarily passing directly from one uranous body to the next adjacent body. The factor $n$ represents any fixed number of neutrons.

The fission reaction may be represented as follows:

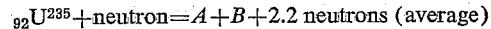

$_{92}U^{235}$+neutron=$A$+$B$+2.2 neutrons (average)

$A$="Light" fission fragment, e.g., Br, Kr, Rb, Sr, Y, Zr, Cb, Mo, 43, Ru, Rh. Atomic mass, 83–99, inclusive. Atomic number, 35–45, inclusive.

$B$="Heavy" fission fragment, e.g., Sb, Te, I, Xe, Cs, Ba, La, Ce, Pr, Nd. Atomic mass, 127–141, inclusive. Atomic number, 51–60, inclusive.

The 100n fast neutrons leaving the uranium body, enter the mass of heavy water moderator to diffuse therethrough and through the bodies over paths long in comparison with the spacing of the bodies within the slurry, to undergo successive collisions that slow them down; and a large proportion of the 100n fast neutrons are thus destined to be reduced to thermal energy. During this diffusion, before the neutrons arrive at thermal energies, a portion of the neutrons diffuse out of the system because of its finite size and is lost to the chain reaction. Furthermore, during the course of the extremely irregular diffusion path of the neutrons while they are being slowed down by elastic collisions predominantly in the heavy water, and to a minor extent in other uranium bodies, further neutrons will reach a uranium resonance absorption energy or energies and will be absorbed by $U^{238}$ to form $U^{239}$. This is known as resonance absorption and includes both surface and volume resonance absorption referred to above.

While resonance absorption is referred to here as a loss, it is only a loss of neutrons with respect to maintenance of the chain reaction, inasmuch as these neutrons provide a gain for the production of new elements. Thus, irrespective of whether the neutron resonance absorption in $U^{238}$ is on the surface, or in the volume of the uranium body, $94^{239}$ is produced by the resonance absorption according to the following process:

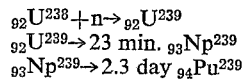

$$_{92}U^{238} + n \rightarrow {}_{92}U^{239}$$
$$_{92}U^{239} \rightarrow 23 \text{ min. } {}_{93}Np^{239}$$
$$_{93}Np^{239} \rightarrow 2.3 \text{ day } {}_{94}Pu^{239}$$

Capture of thermal neutrons by $U^{238}$, as indicated in bodies A and C of FIG. 18, also results in production of $94^{239}$ by the same process.

The $94^{239}$ is a long lived radioactive product (an alpha-emitter) with a half life of about 23,000 years. It remains in the uranium body and is fissionable by thermal neutrons in the same general manner as $U^{235}$. In our system the number of neutrons available for production of $94^{239}$ during each cycle of the chain reaction is relatively large being 43 percent of the neutrons developed by fission. Consequently, our system is of particular use in producing $94^{239}$ which may be used for enriching other chain reacting systems to provide a large K factor and a small critical size. The production of $94^{239}$ in the uranium body greatly prolongs the time during which the reaction can be maintained using the initial uranium in the slurry. The $94^{239}$ can be removed from the uranium by chemical separation if desired.

As shown in FIG. 18, a substantial portion of the 100n original fast neutrons escape resonance capture and fast neutron leakage, and are reduced to thermal energy within the system. Of these thermal neutrons, some neutrons on the average leak by diffusion out of the system and are lost from the chain reaction.

In any practical system, impurities will be present in both the heavy water and the uranium which capture and/or absorb a quantity of the thermal neutrons. This absorption is due to the fact that a few of the thermal neutrons diffusing through the moderator mass are not in a position to promptly enter a uranium mass when they reach thermal energy, and these thermal neutrons must continue to diffuse through the moderator until they do reach a uranium body or are absorbed.

An analysis of the chain reaction just described shows where the gain in production of $94^{239}$ is obtained by following our invention. In previous chain reacting systems using uranium in graphite, wherein the graphite was the neutron moderator, the neutron losses in the graphite were so great that it was necessary to aggregate the uranium into large masses distributed through the graphite in regular array to reduce the surface resonance losses to an amount compensating the losses in the graphite. However, by utilizing, in accordance with our invention, a more efficient neutron moderator and one having a very low neutron capture cross-section, large resonance losses are permissible thereby increasing the neutrons available for $94^{239}$ production. Consequently, by following the teachings of our invention, the $94^{239}$ production is increased by increasing the surface to volume ratio of the uranium through subdivision of the uranium into fine particles such as by utilizing uranium oxide in the heavy water moderator as a fine particle slurry.

In the chain reaction shown in FIG. 18 for a natural uranium bearing slurry, it is assumed that the reproduction ratio is exactly unity, that is, the neutrons developed by fission are exactly equal to the neutron losses. However, the loss of the neutrons by leakage may be reduced by increasing the slurry volume and effectively raising the reproduction ratio to a value greater than unity.

Consider, for example, the condition which would obtain in the chain reaction shown in FIG. 18 if the volume of slurry were suddenly increased to such an extent that a portion of the neutrons normally lost by fast and thermal neutron leakage were saved by such increase in size. In this case, more neutrons would be available to enter the uranium body C. Instead of the production of 100n fast neutrons by fission at the end of the first cycle, as in the balanced condition, more than 100 fast neutrons would then be produced, and the neutron intensity of the system would then rise exponentially with time as each new cycle starts out with 100 plus an increasing number of fast neutrons. The effective reproduction ratio ($r$) of the particular system in this event would be correspondingly increased. In practice, however, the slurry volume would never be increased to this extent.

In order to stabilize the reaction by volume control at any desired neutron density within the system, the neutron density is measured as it increases. When a predetermined neutron density within the system is reached, the level and consequently the volume of the slurry is decreased to a point where more neutrons are lost by leakage through an effective increase in total surface to total volume ratio of the reaction volume. The chain reaction will again be in balance at the new neutron density. To reduce the neutron density the level of the slurry may be decreased still more to increase the leakage of neutrons from the system to a volume such that the neutron density will decay, because less than 100n neutrons will be produced for each 100n original neutrons. The system may be again stabilized at the newly desired lower density level by increasing the volume of the slurry effective in maintaining the chain reaction to a point where $r$ is again unity. It should be distinctly understood that the critical size remains essentially constant for any given conditions of temperature, pressure, and density of the slurry and that critical size is a constant irrespective of the power output in the form of heat. Consequently, the level of the slurry for critical size conditions remains quite constant irrespective of output of the pile. Inherent changes in temperature, pressure, and density may, however, be overcome by varying the level of the slurry up and down on either side of the critical size conditions.

An important element in the control of the pile is the fact that not all of the 100n fast neutrons originating in A or C in FIG. 18 are emitted immediately. About one percent or 1n fast neutrons are "delayed neutrons." These delayed fast neutrons may appear at any time up to several minutes after the fission has occurred. Half of these neutrons are emitted within six seconds and 90 percent thereof within about 45 seconds. The mean time of delayed emission is about 5 seconds. The cycle shown in FIG. 18 is completed by 99 percent of the neutrons in about .0015 second, but if the system is near the balanced condition the extra 1 percent may make all the difference between an increase or a decrease in the activity. The fact that the last neutron in the cycle is held back, as it were, imparts a slowness of response to the system that would not be present if the $100n$ neutrons were all emitted instantaneously.

For cases in which the reproduction ratio $(r)$ differs from unity by less than 1 percent, the ratio of rise is given by the formula $$n = n_0 e^{wt}$$

where $$w = \frac{r-1}{\alpha - (r-1)} \cdot \frac{1}{T}$$

In this formula $\alpha$ is the fraction of the neutrons that are delayed, $\alpha = .01$, T is the mean time of delayed emission of the delayed neutrons $= 5$ seconds.

As an example, suppose as a result of increasing the critical size by increasing the mass of slurry $r$ becomes 1.001. Then $$w = \frac{.001}{.01 - .001} \cdot \frac{1}{5} = \frac{1}{45}$$

that is, $n/n_0 = 2.72$ in 45 seconds. Hence, doubling of the neutron density occurs about every 30 seconds and continues indefinitely.

If $r$ were made exactly 1.01, a more detailed theory shows that the neutron density would be tripled each second. However, if the reproduction ratio $r$ is suddenly increased several percent, so that the one percent delayed neutrons are unimportant compared with $r-1$, the neutron density increases at a much more rapid rate as given approximately by $r^{t/e}$ where e is .0015 second, the normal time to complete a cycle. Thus if $r$ were to be made 1.04, the neutron density would increase in 1.5 seconds by a factor of approximately $10^{17}$ over its original level. However, if $r$ were 1.02 or 1.03, the factor by which the neutron density would be multiplied each second would be 1100 and 700,000 respectively. It is thus apparent that too high a reproduction ratio in a practical system leads to the necessity of providing safety measures, which positively limit all danger of exceeding a permissible rate of neutron density increase. An exceedingly dangerous condition could exist if by accident the volume of slurry was suddenly increased considerably beyond the critical size, as the time required for lowering the level might be too long to prevent destruction of the system. As the same eventual neutron density can be obtained with a reproduction ratio only slightly over unity, as with a higher ratio, only at a slower rate, the lower reproduction ratios are preferred in practice in the interest of safety. Consequently, the neutron reproduction ratio of the system should not exceed about 1.01 during operation of the reactor and control of the reaction should be directed to this end.

As the suspension is withdrawn from the reactor and circulated through the heat exchanger, the neutron reaction substantially ceases due to the fact that the volume suspension being circulated is below a critical size for establishment of a neutron chain reaction. However, delayed neutrons are evolved after withdrawal of the suspension. In order to effect a saving of neutrons, circulation may be conducted at a rate such that the suspension is returned to the reaction zone before all of the delayed neutrons have been evolved. In such a case, a portion of the delayed neutrons will be evolved in the reaction zone and thereby permit use of a smaller volume of slurry or suspension.

In addition to the usual industrial hazards during the operation of the system, operating personnel must be protected from injury by gamma rays and neutrons generated in the reaction tank as well as from radiation from the circulating water surrounding the tank, from beta rays, from close contact with radioactive materials, and from radioactive poisoning due to inhalation of radioactive gases. The major portion of the radiation emitted from the reaction tank is intercepted by the water surrounding the tank and by the concrete shield. The depth or rather, thickness of the water surrounding the reaction tank is determined by the slowing action and capture of the neutrons by the water. Since the heat exchangers contain the radioactive fission products and are nearer the water shield tank, beta rays therefrom must be considered in determining the shielding thickness. The minimum depth of water between the heat exchangers and the lead shield 100 of the tank 50 is 3 feet and the minimum depth from the reaction tank thereto is 8 feet while the thickness of the concrete shield is preferably no less than 10 feet. Inasmuch as the concrete contains water or crystallization and may contain water retaining material, and is relatively dense, it serves as an effective shield for neutrons as well as gamma rays. In addition to these precautions we prefer to provide the lead shield 100 of a thickness of 6 inches, lead being very effective as a gamma ray shield. The slurry removal line through which the slurry is withdrawn for separation of solid matter therefrom, should likewise be shielded after passing through the concrete shield. Such shielding may be effected by passing this line through the concrete base, embedding the line in concrete and covering the concrete with sufficient depth of earth to reduce the radiation at the surface to less than that equivalent to an exposure (for adjacent personnel) of 0.10 roentgen per 8 hour day. Any leakage of the slurry into the circulating water in which the apparatus is immersed will cause contamination of the water and consequent radioactivity therein. In addition, neutrons escaping from the reaction tank may produce radioactive isotopes of any impurities present in the circulating water. Consequently, it is preferred to cool the water, following circulation within the concrete shield, in a cooling tower from which operating personnel may be excluded although this cooling water may be once circulated and discarded to a deep well, for example. In addition to the above precautions a portion of the water within the concrete shield is decomposed into hydrogen and oxygen under high neutron bombardment, and any absorbed gases in the water, such as atmospheric gases, may become radioactive. These gases may be vented with great dilution through a chimney or stack without harm to operating personnel or to those in the surrounding territory. Such precautions will reduce the radiation from the structure to 0.10 roentgen per 8 hour day per person at the point of closest approach, this exposure being the maximum safe radiation permissible to which an individual may be subjected over the whole body.

The system and processes herein contemplated have been particularly described with reference to a slurry. However, it is to be understood that the invention is generally applicable to suspensions of a fissionable isotope or material such as $94^{239}$, $U^{235}$ or $U^{233}$ suspended in a fluid, preferably liquid moderator, and thus the invention is applicable to true solutions as well as slurries. Moreover, moderators other than deuterium oxide may be used. Where natural uranium is used as the fissionable component, pure deuterium oxide or at least a mixture of light and heavy water containing 75 to 90 percent or more of deuterium oxide is an effective moderator. Moreover, deuterocarbons, such as deuterodiphenyl, are suitable. In addition, molten suspensions, such as molten thorium or uranium-beryllium alloys, could be used. On the other hand, if the fissionable component is a pure fissionable isotope or comprises a thorium or uranium mixture containing more than 0.7 percent of the fissionable isotope, a wider latitude in choice of moderators may be used, and if the concentration of the fissionable isotope is sufficiently high, ordinary water is a suitable moderator.

The invention has many uses. Radioactive fission products and new elements, both radioactive and stable, are produced by absorption of neutrons in the uranium.

Large quantities of neutrons and penetrating gamma rays are produced and can be utilized. With proper heat exchangers, power in the form of heat can be obtained.

If desired, the fission products, radioactive and stable, and the $94^{239}$ produced by normal operation of the pile can be recovered after a predetermined exposure of the uranium in the slurry to high neutron densities by removing the slurry, separating the uranium therefrom, and extracting the desired elements as referred to above. The radioactive fission products are valuable as gamma radiation sources and for use as biological tracers in medicine, while $94^{239}$ is useful as a fissionable material to increase K factors when added to natural uranium, or when used alone, in chain reacting systems.

While the theory of the nuclear chain fission mechanism in uranium set forth herein is based on the best presently known experimental evidence, we do not wish to be bound thereby, as additional experimental data later discovered may modify the theory disclosed. Any such modification of theory, however, will in no way affect the results to be obtained in the practice of the invention herein described and claimed.

What is claimed is:

1. A nuclear fission chain reacting system comprising a reaction tank, a liquid slurry consisting of uranous material in heavy water containing 0.04 to 0.0025 atom of U per molecule of $D_2O$ disposed in said tank, the slurry being the only element of the system containing material fissionable by neutrons of thermal energy, slurry circulating means in series flow relation with the slurry in said tank, means for flowing a coolant into heat exchange relation with said slurry circulating means, means for flowing said coolant into heat exchange relation with said tank, and discharge means withdrawing said coolant following heating thereof by said slurry and by said tank, whereby heat is withdrawn from said slurry and said tank.

2. In a nuclear fission chain reacting system a reaction tank having a semispherical portion surmounted by a cylindrical portion, a quantity of slurry including uranium oxide and heavy water in a concentration of 0.0025 to 0.04 atom of uranium per molecule of $D_2O$ in the semispherical portion of said tank to support a chain reaction, and means adjacent to the junction of said tank portions to limit the chain reaction volume to that within the semispherical tank portion.

3. The method of producing element 94 comprising the steps of suspending an oxide of uranium in heavy water to form a slurry in a concentration of 0.0025 to 0.04 atom of uranium per molecule of $D_2O$, developing a nuclear chain reaction in a volume of said slurry to develop the element 94 therein, withdrawing a portion of said slurry from the volume of said slurry during the maintenance of said chain reaction, and separating the element 94 from other constituents of said slurry.

4. The method of obtaining the products of a nuclear fission chain reacting system wherein the reacting mass comprises a heavy water suspension of active material that includes thermal neutron fissionable material, comprising the steps of circulating the slurry through a chamber, bleeding off a portion of said slurry, removing the active material from said slurry, and returning the heavy water of the bled-off slurry to said system.

5. The method of obtaining fission products from a circulating heavy water thermal neutron fissionable material slurry of a self-sustaining nuclear fission system comprising the steps of initiating a self-sustaining nuclear fission reaction, sustaining said reaction until a predetermined concentration of fission products are formed in said slurry, bleeding off a portion of said slurry while maintaining said chain reaction, and removing the fission products from the bled-off slurry.

6. The method of recovering the products of a nuclear fission chain reaction wherein the active material comprises a suspension of thermal neutron fissionable material in a fluid moderator, comprising the steps of circulating the suspension through a chamber, bleeding off a portion of said suspension, and separating the active material from the moderator of said suspension.

7. The method of obtaining nuclear fission products which comprises assembling a sufficient volume of a slurry comprising a thermal neutron fissionable material in heavy water to initiate a self-sustaining nuclear chain reaction, maintaining said reaction for a period of time to obtain a quantity of fission products in said material, progressively removing the said material containing said fission products, and replenishing said volume with additional thermal neutron fissionable material substantially free of fission products.

8. A device for effecting a nuclear chain reaction comprising a reaction tank, a quantity of slurry consisting of uranium and heavy water in the proportion of between 0.0025 and 0.04 atom of uranium per molecule of $D_2O$ in said tank, a closed circulating system for circulating said slurry whereby heat developed by nuclear fission of the uranium and by fission products therein may be removed from said slurry, means for continuously removing a portion of said slurry from said tank, means for separating the uranium-containing material from the heavy water of said removed slurry, and means for returning the heavy water separated from said slurry to said tank.

9. In a continuously operating nuclear fission chain reacting system comprising a slurry of uranium and heavy water, said uranium being fissionable with the production of elements 93 and 94 and fission products, means for continuously circulating the slurry in said system for removal of heat therefrom, and continuously operative means for removing elements 93 and 94 and fission products from said system during the continuation of a nuclear fission chain reaction therein.

10. A device for effecting a controlled nuclear chain reaction comprising a container, a closed liquid circulating system leading from and returning to said container, a heat exchanger in said closed system, a slurry consisting of uranium containing particles in heavy water in the proportion of between 0.0025 to 0.04 atom of uranium to molecules of $D_2O$ in said container and said system to support a nuclear fission chain reaction and form elements and fission products therein, means for circulating said slurry through the said circulating system, means for bleeding off some of the slurry for extraction of elements and fission products formed by fission of said uranium, and means for varying the critical size of the slurry in said container to control the nuclear chain reaction therein.

11. A method which comprises establishing a self-sustaining neutron chain reaction in a suspension of a thermal neutron fissionable material suspended in a fluid moderator, withdrawing and cooling a portion of the suspension, and maintaining the volume of the suspension undergoing cooling below the critical size necessary for a self-sustaining chain reaction during the cooling operation.

12. A device for effecting a nuclear chain reaction comprising a slurry containing all the thermal neutron fissionable material in the device consisting of granulated uranium oxide particles of less than 2 microns diameter suspended in deuterium oxide in the proportion of 0.0025 to 0.04 atom of uranium per molecule of deuterium oxide, means to retain said slurry in spherical form with a radius of approximately $$\frac{56.5}{\sqrt{K-1}}$$

centimeters, where K is the neutron reproduction factor of the slurry and is greater than unity, a closed liquid circulating system including the slurry retaining means and a heat exchanger in said system.

13. A self-sustaining nuclear fission chain reacting system comprising a mass of a suspension consisting of uranium in heavy water in the proportion of 0.04 to 0.0025 atom of uranium per molecule of heavy water, the heavy water having a neutron absorption cross-section of approximately 4 millibarns, said mass being spherical in shape and having a radius not less than that defined relative to the concentration of uranium and heavy water by the dashed line of FIGURE 6, the abscissa setting forth concentrations and the right ordinate setting forth radii.

14. The method of controlling a self-sustaining chain reacting system which comprises disposing within a spherical chamber a suspension consisting of heavy water and uranium wherein the ratio of the uranium atoms to deuterium oxide molecules lies between approximately 0.0025 and 0.040, and varying the volume of the suspension within the chamber to control the neutron-reproduction ratio of the system, the chamber having a radius greater than that set forth by the right ordinates of FIGURE 6 for the concentration of the slurry set forth by the abscissa, the heavy water in said slurry having an absorption cross-section of approximately four millibarns.

15. A neutronic reactor comprising a cylindrical tank 14 feet in diameter and greater than six feet in height, a slurry consisting of heavy water and uranium disposed within the tank, said slurry containing all of the fissionable material in the reactor and having a concentration of about 0.01 uranium atom per molecule of heavy water, the uranium being in the form of particles smaller than two microns, the height of said slurry being approximately six feet, and a closed slurry circulating system including the tank and heat exchanger.

References Cited in the file of this patent

UNITED STATES PATENTS

| | | |
|---|---|---|
| 1,953,076 | Davies | Apr. 3, 1934 |
| 2,097,769 | Mitscherling | Nov. 2, 1937 |
| 2,206,634 | Fermi et al. | July 2, 1940 |
| 2,252,740 | Teter | Aug. 19, 1941 |
| 2,592,112 | Bradshaw | Apr. 8, 1952 |
| 2,708,656 | Fermi et al. | May 17, 1955 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |
| 114,151 | Australia | May 3, 1940 |

OTHER REFERENCES

Compt. Rend., vol. 208, 1394–6, 1573–5 (1939); vol. 209, 301–3 (1939).

Goodman: "The Science and Engineering of Nuclear Power," vol. 1, page 275, Addison-Wesley (1947).

Kelly et al., Phy. Rev. 73, 1135–9 (1948).

Pollard and Davison: "Applied Nuclear Physics," page 256, John Wiley & Son, New York (1951), 2nd edition.

Physical Review, 56 (1939), pages 284–286.

Nature, 143 (1939), pages 470, 471, 680.

Naturwissenchaften, vol. 27 (1939), pages 402–410.

Nuclear Reactor Development, Atomic Industrial Forum, New York 16, New York, proceedings held at Washington, D.C., May 24, 1954, page 18.